(12) United States Patent
Kondakindi

(10) Patent No.: US 12,174,826 B2
(45) Date of Patent: Dec. 24, 2024

(54) SYSTEMS AND METHODS FOR UNIFIED DATA VALIDATION

(71) Applicant: Synchrony Bank, Stamford, CT (US)

(72) Inventor: Saisharath Kondakindi, Stamford, CT (US)

(73) Assignee: Synchrony Bank, Stamford, CT (US)

(*) Notice: Subject to any disclaimer, the term of this patent is extended or adjusted under 35 U.S.C. 154(b) by 0 days.

(21) Appl. No.: 18/364,704

(22) Filed: Aug. 3, 2023

(65) Prior Publication Data

US 2024/0045855 A1     Feb. 8, 2024

Related U.S. Application Data

(60) Provisional application No. 63/370,248, filed on Aug. 3, 2022.

(51) Int. Cl.
| | |
|---|---|
| *G06F 16/23* | (2019.01) |
| *G06F 16/242* | (2019.01) |
| *G06F 16/2453* | (2019.01) |
| *G06N 20/00* | (2019.01) |

(52) U.S. Cl.
CPC ........ *G06F 16/2365* (2019.01); *G06F 16/242* (2019.01); *G06F 16/24532* (2019.01); *G06N 20/00* (2019.01)

(58) Field of Classification Search
CPC ............... G06F 16/2365; G06F 16/242; G06F 16/24532
See application file for complete search history.

(56) References Cited

U.S. PATENT DOCUMENTS 9,977,760 B1 * 5/2018 Diehl ...................... G06F 16/13

* cited by examiner

*Primary Examiner* — Baoquoc N To
(74) *Attorney, Agent, or Firm* — Polsinelli LLP

(57) ABSTRACT

Examples described herein include implementations for big-data validation. One aspect includes generating a configuration file including dynamic matching data describing a first plurality of data entries and a second plurality of data entries, and generating a data action file. A plurality of data queries are generated based on the dynamic matching data indicated in the configuration file. The plurality of data queries are dynamically executed in parallel, including execution of a plurality of simultaneous data queries to the data source system. Fields of the first plurality of data entries and the second plurality of data entries are matched using the key type and the value structure, corresponding fields of the first data fields and the second data fields having a data mismatch are identified, and a mismatch database entry for the corresponding fields having the data mismatch is automatically generated.

36 Claims, 17 Drawing Sheets

1100

GENERATING A CONFIGURATION FILE, THE CONFIGURATION FILE INCLUDING DYNAMIC MATCHING DATA DESCRIBING A FIRST PLURALITY OF DATA ENTRIES AND A SECOND PLURALITY OF DATA ENTRIES
1102

GENERATING A DATA ACTION FILE, THE DATA ACTION FILE IDENTIFYING A FIRST DATA SET INCLUDING THE FIRST PLURALITY OF DATA ENTRIES, A SECOND DATA SET INCLUDING THE SECOND PLURALITY OF DATA ENTRIES, A KEY TYPE, AND A VALUE STRUCTURE ASSOCIATED WITH THE KEY TYPE, WHEREIN THE FIRST DATA SET AND THE SECOND DATA SET ARE STORED IN A DATA SOURCE SYSTEM, WHEREIN THE FIRST PLURALITY OF DATA ENTRIES INCLUDES FIRST DATA FIELDS, AND WHEREIN THE SECOND PLURALITY OF DATA ENTRIES INCLUDES SECOND DATA FIELDS
1104

DYNAMICALLY GENERATING A PLURALITY OF DATA QUERIES INCLUDING KEY TYPE QUERIES, VALUE STRUCTURE QUERIES AND DYNAMIC VALUE STRUCTURE QUERIES, WHEREIN THE DYNAMIC VALUE STRUCTURE QUERIES ARE GENERATED IN REAL-TIME BASED ON THE DYNAMIC MATCHING DATA INDICATED IN THE CONFIGURATION FILE, AND WHEREIN THE DYNAMIC VALUE STRUCTURE QUERIES BEING GENERATED BASED ON A FIRST DATA TYPE, A SECOND DATA TYPE, AND DATA FIELD TYPES PRESENT IN THE FIRST DATA SET AND THE SECOND DATA SET
1106

DYNAMICALLY EXECUTING THE PLURALITY OF DATA QUERIES IN PARALLEL, WHEREIN PARALLEL EXECUTION OF THE PLURALITY OF DATA QUERIES INCLUDES A PLURALITY OF SIMULTANEOUS DATA QUERIES TO THE DATA SOURCE SYSTEM INCLUDING THE FIRST DATA SET AND THE SECOND DATA SET
1108

MATCHING FIELDS OF THE FIRST PLURALITY OF DATA ENTRIES AND THE SECOND PLURALITY OF DATA ENTRIES USING THE KEY TYPE AND THE VALUE STRUCTURE
1110

IDENTIFYING CORRESPONDING FIELDS OF THE FIRST DATA FIELDS AND THE SECOND DATA FIELDS HAVING A DATA MISMATCH
1112

AUTOMATICALLY GENERATING A MISMATCH DATABASE ENTRY FOR THE CORRESPONDING FIELDS HAVING THE DATA MISMATCH
1114

```
┌─────────────────────────────────────────────────────────┐
│ GENERATING A CONFIGURATION FILE ASSOCIATED WITH A FIRST │
│ DATA SET, WHERE THE CONFIGURATION FILE INDICATES VALUES │
│ USED FOR GENERATION OF DYNAMIC VALUE STRUCTURE QUERIES, │
│ AND WHERE THE CONFIGURATION FILE IS GENERATED USING A   │
│ MACHINE LEARNING ALGORITHM TRAINED FROM MISMATCH        │
│ DATABASE ENTRY TRAINING DATA                            │
│ 1202                                                    │
└─────────────────────────────────────────────────────────┘
                              │
                              ▼
┌─────────────────────────────────────────────────────────┐
│ GENERATING A FEEDBACK VALUE ASSOCIATED WITH A MISMATCH  │
│ DATABASE ENTRY, WHERE THE FEEDBACK VALUE IDENTIFIES A   │
│ DIFFERENCE BETWEEN AN EXPECTED RESULT AND AN ACTUAL     │
│ RESULT IN THE MISMATCH DATABASE ENTRY, WHEREIN THE      │
│ FEEDBACK VALUE IS ASSOCIATED WITH SETTINGS IN THE       │
│ CONFIGURATION FILE                                      │
│ 1204                                                    │
└─────────────────────────────────────────────────────────┘
                              │
                              ▼
┌─────────────────────────────────────────────────────────┐
│ UPDATING THE MISMATCH DATABASE ENTRY TRAINING DATA AND  │
│ THE MACHINE LEARNING ALGORITHM USING THE FEEDBACK VALUE │
│ AND THE MISMATCH DATABASE ENTRY TO GENERATE UPDATE      │
│ MISMATCH DATABASE ENTRY TRAINING DATA                   │
│ 1206                                                    │
└─────────────────────────────────────────────────────────┘
```

FIG. 12

SYSTEMS AND METHODS FOR UNIFIED DATA VALIDATION

CROSS-REFERENCE TO RELATED APPLICATION

The present application claims priority to U.S. Provisional Patent Application 63/370,248, filed Aug. 3, 2022, which is incorporated herein by reference in their entireties.

FIELD

The present disclosure relates generally to systems and methods for data management and validation in big data environments. Additional disclosures related to data management with change tracking and analytics.

BACKGROUND

Big data systems operate in an environment of data growth, where a system may receive billions of pieces of data per day from different sources. Traditional database systems (e.g., Oracle™, Microsoft™, and other such server systems), can handle terabytes of such data that accumulate over time, but the management of such data in traditional systems operates in proprietary environments where management of data in a given system is limited by the system structure. Such large amounts of data, can, for example, be generated in an environment where users seek to obtain and use credit from a lending institution for a variety of purposes. In some circumstances, a client may interact with a merchant in an environment where the client prefers additional security and protection for the client's data. Changes in data security systems and environments where similar data may be aggregated from data sources with different formats for the same data can make managing and validating terabytes of data in a traditional environment difficult.

Additionally, enterprise systems that manage such big data are growing more and more complex, with application metadata and application technology stacks having complexity growth that, while not on par with the large data volumes described above, can include increasing complexity that can cause system problems and issues when not tracked and managed appropriately, particularly when associated with security systems and environments.

BRIEF DESCRIPTION OF THE DRAWINGS

The present disclosure is described in conjunction with the appended figures:

FIG. 11 is a flow diagram illustrating a method in accordance with some examples.

FIG. 12 is a flow diagram illustrating a method in accordance with some examples.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only and is not intended to limit the scope, applicability or configuration of the disclosure. Rather, the ensuing description of the examples of embodiment(s) will provide those skilled in the art with an enabling description for the described implementations. In the following description, for the purposes of explanation, specific details are set forth in order to provide a thorough understanding of certain inventive embodiments. It is understood that various changes can be made in the function and arrangement of elements without departing from the spirit and scope as set forth in the appended claims. Additionally, it will be apparent that various embodiments may be practiced without these specific details. The figures and description are not intended to be restrictive.

As described above, big data systems with terabytes or more of data can involve data in multiple formats. When validating data in such a big data environment, element by element comparison of data to check for errors, redundancy, or data matching involves excessive resource usage. Aspects described herein include tools, systems, and operations to compare data from multiple sources using configuration settings to define limited data comparisons.

In one example, two separate databases are identified in a configuration file, along with identifying information for records within those databases to be compared and validated. Such databases can, for example, be databases involving student records in different formats, and the configuration file can identify specific students (e.g., by name, identifier, etc.) who are associated with data in the separate databases, with associated information from the databases to be gathered, compared, and validated.

Figure 1:
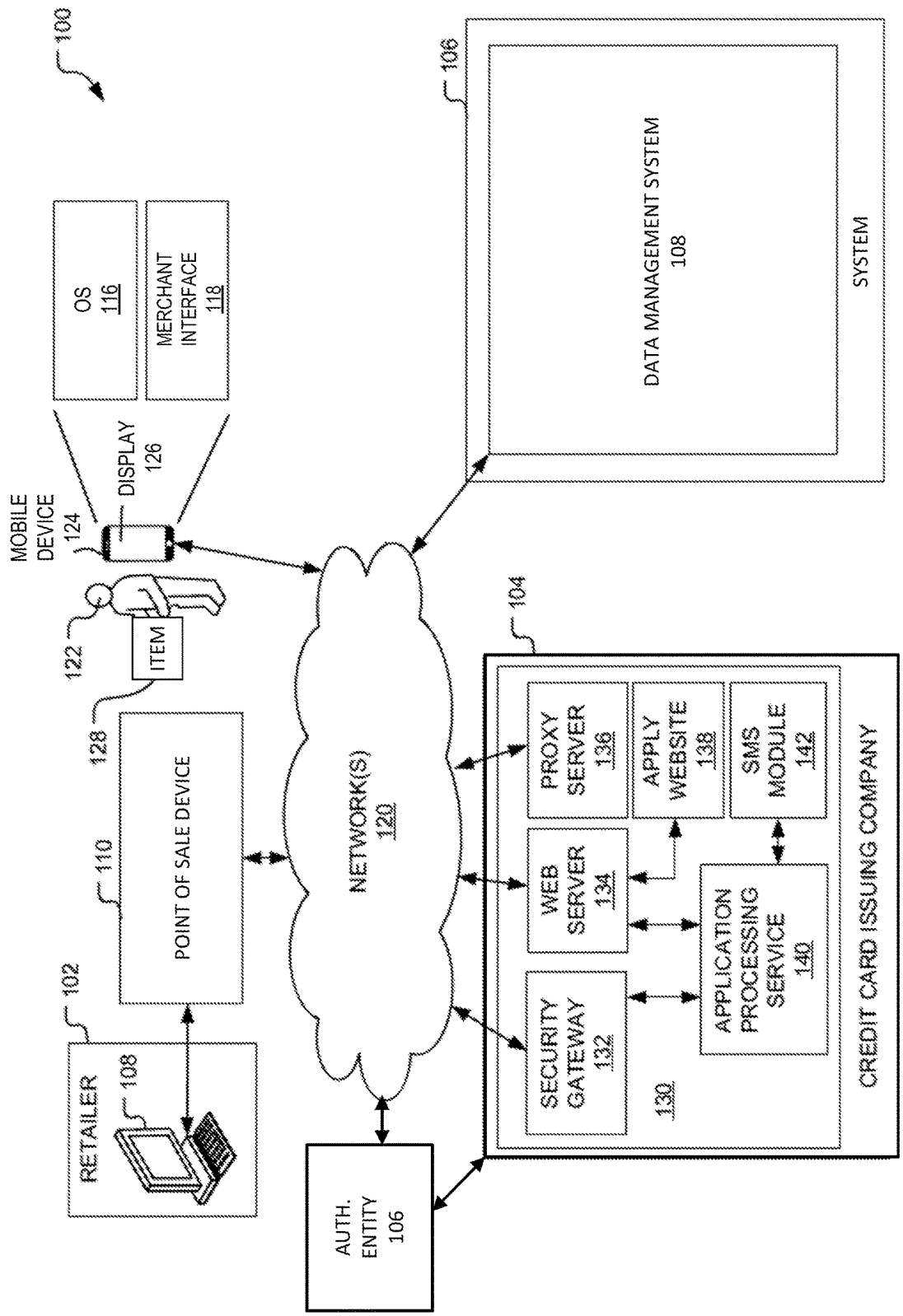
FIG. 1 depicts aspects of a system that can be used in accordance with examples described herein.

FIG. 1 is a block diagram of a system 100 which can generate data that can be merged or otherwise used with a data validation system in accordance with aspects described herein. The example system 100 includes a retailer 102, a credit card issuing system 104, and an authentication entity 106. In some systems, aspects can be merged, such as for example, the authenticating entity 106 being merged with the credit issuing system 104 such that devices of entity 106 and system 104 can be the same device or devices. The retailer 102 (e.g. a merchant or other client of authentication entity 106) includes a retail computing system 108 connected to at least one POS device 110. The POS device 110 of FIG. 1 can include various systems for communicating with mobile device 124. The communication systems can include Bluetooth®, WiFi®, or other wireless network systems for communication. In some examples, rather than communicating using local wireless communications, a code or other matching mechanism can be used to match application(s) associated with merchant interface 118 with POS device 110 via a wide area network (e.g., the Internet) to allow communications and dynamic synchronization between POS device 110 and mobile device 124. In various implementations, the mobile device 124 can access various communication channels, including short message service (SMS), text, application-based communications, e-mail, web browsers, or other such communication channels.

Once a connection is established between POS device 110 and mobile device 124, custom tender operations can be performed using application(s) or web code including the merchant interface 118 as described below. Additionally, other implementations of POS device 110 can include a credit card scanner or other payment input, a keypad, or other such elements. Additional examples of a POS device 110 can be a tablet device, a smartphone, a laptop computer, or any other such device that can be accessed by a customer, either directly, or through an employee of the retailer. The retail computing system 108 may be directly connected or connected by one or more networks 120 (described below) to the POS device 110. The retail computing system 108 and the POS device 110 may each be implemented by one or more computing devices, which may each be implemented as a computing device with architecture 1600 described below and illustrated in FIG. 16.

Referring to FIG. 1, the POS device 110 is configured to be operated by a customer 122 having the mobile device 124 (e.g., a cellular telephone) with a display device 126 (e.g., a conventional touch screen) executing an operating system (OS) 116 and a merchant interface 118 along with one or more applications. For example, the customer 122 may purchase one or more items 128 using the POS device 110. As will be described below, the customer 122 may also use the POS device 110 and the mobile device 124 to apply for credit (e.g., using apply website 138), to use an existing credit account (e.g., using authenticating entity 106), or to access an offer associated with a transaction. Enabling the customer 122 to request credit at the POS device 110 and complete the application process using the mobile device 124 gives the customer 122 the opportunity to save money or make flexible financial arrangements by applying for credit when it is needed in a quick and easy manner.

The credit card issuing system 104 operates one or more computing devices 130. The computing device(s) 130 implements a security gateway 132, a web server 134, a proxy server 136, an application processing service 140, and a SMS module 142. The security gateway 132 is configured to communicate with the POS device 110 over the network(s) 120. The web server 134 and the proxy server 136 are both connected to the network(s) 120. The web server 134 is configured to generate an apply website 138. The application processing service 140 is configured to communicate with the security gateway 132 and/or the web server 134. The SMS module 142 is configured to communicate with the application processing service 140. The SMS module 142 may be implemented by middleware. By way of a non-limiting example, the computing device(s) 130 may each be implemented as the computing device architecture 1600 described below and illustrated in FIG. 16.

The authentication entity 106 operates one or more authentication computing devices configured to communicate over the network(s) 120. The authentication computing device(s) may implement a Uniform Resource Locator ("URL") generator, a device authentication service, an SMS service, a pre-fill service, and/or a token service, as part of systems that generate data that can be processed by a data validation service in accordance with aspects described herein (e.g., the data validation system 934 element of FIG. 9). By way of a non-limiting example, the computing device(s) used for any element of FIG. 1 may each be implemented as the computing device with architecture 1600 described below and illustrated in FIG. 16.

As described herein, the mobile device 124 (e.g., customer device) can be used in conjunction with POS device 110 to establish secure communications between customer 122 and retailer system 108. In some contexts, a customer 122 is concerned about privacy and financial communications, in particular with respect to a retailer employee that may be communicating with customer 122. A customer 122 can additionally have concerns about data being communicated with retailer system 108 being visible to checkout employees of the retailer in ways that customer 122 can wish to avoid, such as the possibility of a credit request being rejected.

Devices and separate systems, such as those described above in FIG. 1, can generate massive amounts of data (e.g., billions of data elements, terabytes of data, or more). Separate systems, such as retailer system 108, authentication entity 106, credit card issuing system 104, and any number of systems interacting with the mobile device 124 of the customer 122 can generate matching data in different formats. In accordance with aspects described herein, data management systems are described that can provide improved system operation with parallel processing of data portions, and configuration systems that reduce processing time and improve reporting for comparison, validation, and merged data sets.

Figure 2:
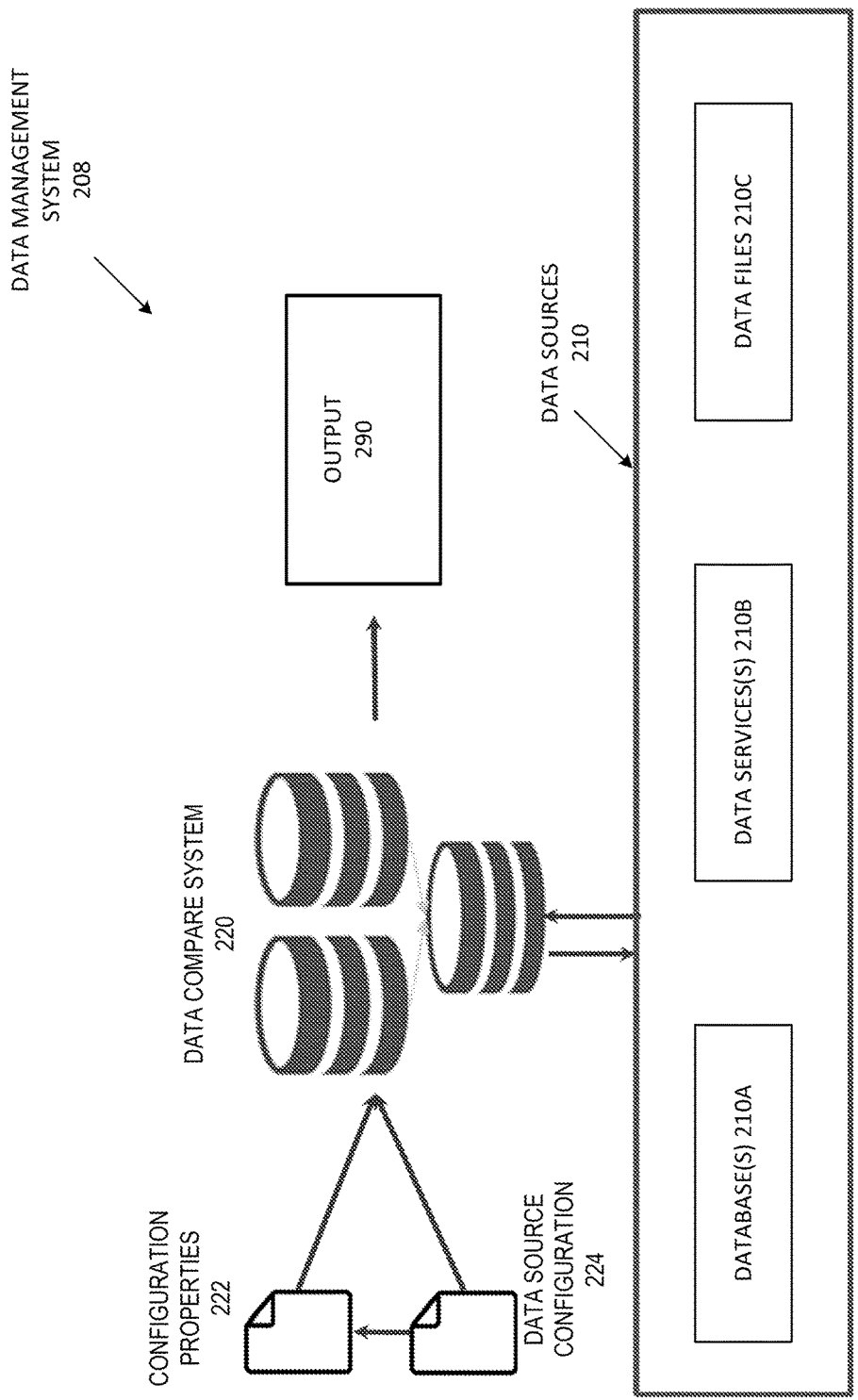
FIG. 2 depicts aspects of a data management system in accordance with aspects described herein.

FIG. 2 depicts aspects of a data management system in accordance with aspects described herein. The data management system 208 includes data sources 210, a data compare system 220, configuration properties 222 and data source configuration(s) 224, and output 290. Such a system can be used to automate the comparison and validation process between different data sets, including when one data set has a small data volume and another data set includes a big data volume (e.g., at the row and column level). Tools within the system can be used to identify differences within data from a similar or same source platform and format, as well as cross data platforms, by removing limitations on data source and database types or file types, and managing the differences with configuration properties 222 and data source configuration 224. Such systems improve the operation of devices configured for data validation by allowing efficient (e.g., reduced) operation time and by avoiding errors with separate data configuration and data source configuration inputs.

Data sources 210 can, for example, be any number of different database or data source systems, such as Oracle™ databases, Microsoft™ SQL databases, comma separated value files, or any other such data source. Such sources can have data and file structure types that vary widely, and the data management system uses the separate configuration properties 222 and data source configuration 224 inputs to separately manage such differences. Data sources 210 of FIG. 2 are shown to include databases 210A, Data Services 210B, and Data Files 210C. In other examples, any number or type of data source can be used with the data management system 208 or other such data management systems in accordance with aspects described herein.

The data compare system 220 can accept information from the data sources 210 in formats that range from very small (e.g., thousands of bytes) volume to very large volume (e.g., billions of rows per column) data formats. A simple data file 210C can include a comma separated value format with a small number of data cells, and a data service 210B or database 210A can include gigabytes, terabytes, petabytes, or more of data in complex non-standard formats. The data compare system 220 can perform granular comparisons based on inputs from configuration properties 222 and data source configuration 224 to automate analysis of data. Such a tool (e.g., the data compare system 220) has functionality to compare data among same platform or cross platform technologies to validate data across life cycles of data flows in an enterprise wide structure. The data compare system 220 can cover different data sources by removing limitations on volume, platform type, file type, query conversion, database type, or other such comparison limitations. In many data validation systems, such limitations are present to provide quality checks and avoid errors by providing standardized validation configurations. Such limitations, however, prevent many types of data validation between different data sizes, different data types, or other such limitations, due to the limits of the available configurations.

Data compare system 220 can provide universal comparison of raw data, with inputs (e.g., configuration properties 222 and data source configuration 224) providing the needed information to regulate and manage the comparison and validation of differently formatted data that would not be available in different comparison systems. Agile methodologies can be used in some alternate systems, where product and data pipelines are delivered in increments, and then validating data for each increment without impacting existing modules. Such systems, however, involve significant amounts of manual effort. The data management system 208 improves device operation by reducing the need for per-validation manual configuration, and instead creates the configuration properties 222 and data source configuration 224 for the data compare system 220 to reduce or eliminate such manual configuration. Additionally, some implementations can automate the manual efforts, and can identify errors or problems with both manual configurations and the automated configurations using machine learning and artificial intelligence (AI) feedback. All such data management systems 208 as described herein improve the operation of data validation systems and devices by reducing errors, increasing automation, and increasing functionality (e.g., compared to format limited validation tools and manual configuration tools).

In order to configure the data compare system 220, the configuration properties 222 and the data source configuration 224 provide detailed information to allow the data compare system 220 to manage data sets from widely varying data sources 210. The data source configuration 224 provides information related to source platform authentication, and formatting. This information can be used not only to retrieve data from a particular data source 210 in a secure environment (e.g., using driver names, user names, passwords, etc.), but can also be used for tracking data source driver and version information that can impact data formatting and validation. Further, the data source configuration 224 information can be used to automatically access data, and confirm data status (e.g., changes in source data sets). For example, in some implementations, the data set being validated by the data compare system 220 (e.g., using a given set of configuration properties 222 and a data source configuration 224 for the particular data) can be updated while the data compare system 220 is performing a validation. Data source configuration 224 can identify how such updates to data in a data source 210 is identified as the data is validated by the data compare system 220 (e.g., in conjunction with another set of data that the updated data set of data sources 210 is validated against). In some implementations, data received in real time in a data source of data sources 210 as data compare system 220 is validating the data can be ignored, with the data set status or details included in the output 290. In other implementations, the real-time update to the data of a data source can be integrated into the validation operations as they are occurring in real-time, or the updated data can be segmented with impacted portions of the validation re-validating after the initial validation operations by data compare system 220 are complete.

Configuration properties 222 can include details on queries to be executed on a source platform (e.g., for data sources of the data sources 210 where certain queries are specific to the platform and where platform standards provide improved results) versus queries that can be run by the data compare system 220 as part of validation within the data compare system 220. Additionally, if source data platforms of the data sources 210 involve authentication during validation operations, the configuration properties 222 can include information on how such authentication is managed as the compare operations of the data compare system 220 occur. Additional information in configuration properties can include key fields used for identification of records and rows of data sources (e.g., using complex keys with identification of field names for different data sources of data sources 210). The configuration properties 222 can additionally include information about value field formatting for particular data sources. For example, when different data sources store the same data using different value field formats, the configuration properties 222 can include this information and pass the information to the data compare system 220 for use during validation and comparison operations. In some implementations, the configuration properties 222 can identify fields which only need to be compared between a source and a destination, and can separate such fields from other fields.

In some aspects, machine learning or artificial intelligence systems can be used to perform data comparisons and/or set configuration properties. For example, in some aspects, an initial output 290 can be analyzed by a machine learning system using the configuration properties 222, data source configuration 224 information, and output 290 information as inputs. Prior history associated with such outputs can be used to train the machine learning system, and the analysis of the output 290 can be used to provide modified configuration or data source configuration properties for a refined data comparison operation. The data compare system 220 can thus use machine learning feedback along with iterative analysis of output data (e.g., the output 290) compared with output targets or output history data to iteratively improve the outputs, or to improve future data compare operations performed by the data compare system 220 using similar configuration properties or data source configurations. Assessment of the output 290 (e.g., errors, problematic data, etc.) can be performed and the assessment data used as part of machine learning feedback to improve the algorithms of the data compare system 220 to improve future data compare operations by the data management system 208. Such improvements can be targeted based on any value of the configuration properties 222 and/or the data source configuration 224 values, to provide targeted feedback based on the types of data being processed by the data management system 208.

The output 290 from the data compare system 220 (e.g., the validation tool) can include a summary report (e.g., text) of the comparison operations, a list of matching rows, a list of mismatched rows, a list of rows with no comparison between data sets (e.g., on set of data involved in the comparison does not include a similar or corresponding row related to a row in the other data set). The output 290 may additionally include a report on expected rows not present (e.g., the negative of the additional actual row described above). Such elements of an output 290 can include additional details on errors, issues with data sources of data sources 210 having corrupted or problematic data sets (e.g., due to source version, known errors, mismatch errors caused by particular pairs of compared data, etc.). Report elements on mismatched rows can include details on actual mismatches or mismatch types. For example, swapped character mismatches where only one or two characters in a multi-character value are different, can be flagged as potential typos for data which is expected to be intended as a match. Additionally, certain dummy data (e.g., where default dates are present instead of an expected date . . . such as where a systems default initial data is January 1, and January 1 is present in a data field instead of an expected alternate birthdate) can be flagged as an expected type of default entry mismatch. In such instances, where the correct value can be inferred from the mismatch, the data compare system 220 may report the mismatch, and generate an autocorrected entry with the expected correct data. In some implementations, machine learning or AI feedback can be used with such systems to automate identification and correction of predictable mismatch errors, such as typo or default selection mismatches described above.

In some implementations, the configuration properties 222 and data source configuration 224 inputs can be optional, or can be implemented with default settings. Where no such setting is provided to the data compare system 220, the data compare system 220 may perform a comparison, but may flag expected errors due to lack of configuration. In some implementations, configuration properties 222 and data source configuration 224 may be set according to machine learning or AI operations, with feedback from output 290 used to improve future instances of configuration properties 222 or data source configuration 224 selected by the machine learning/AI system.

When compare properties from configuration properties 222 and connection properties from data source configuration 224 are passed to the data compare system 220 (e.g., as arguments to a tool), the data compare system 220 will take care of the remaining processes to execute the validation (e.g., comparison) operation in accordance with the arguments provided from configuration properties 222 and data source configuration 224.

In some implementations, the data compare system 220 can initiate or perform compare processes on row and column levels of the data from data sources 210 based on key and value properties from a compare property file (e.g., configuration properties 222) including data type handling. Such compare operations can be performed in accordance with the details of particular pairs of data from data sources 210 without losing precision (e.g., by using the as present values of the data without degrading the data). In some implementations, the data compare system 220 will segregate results based on differences into multiple reports such that time to validate the data is considerably reduced from manual to automated process. As discussed below, such separate reports may be generated from comparisons of separate data subsets compared in parallel, improving the efficiency and system completion time for a final report from output 290. Additionally, by providing a partial report as part of output 290 ahead of complete completion of the full report, an initial analysis may be performed on the initial results. In some implementations, the initial report can be used to halt a run of the full comparison, and allow correction of errors, thereby improving efficiency of the system by preventing unnecessary or incorrect operations from completing when they will be fully rerun due to the identified error from the partial initial report.

Figure 3A:
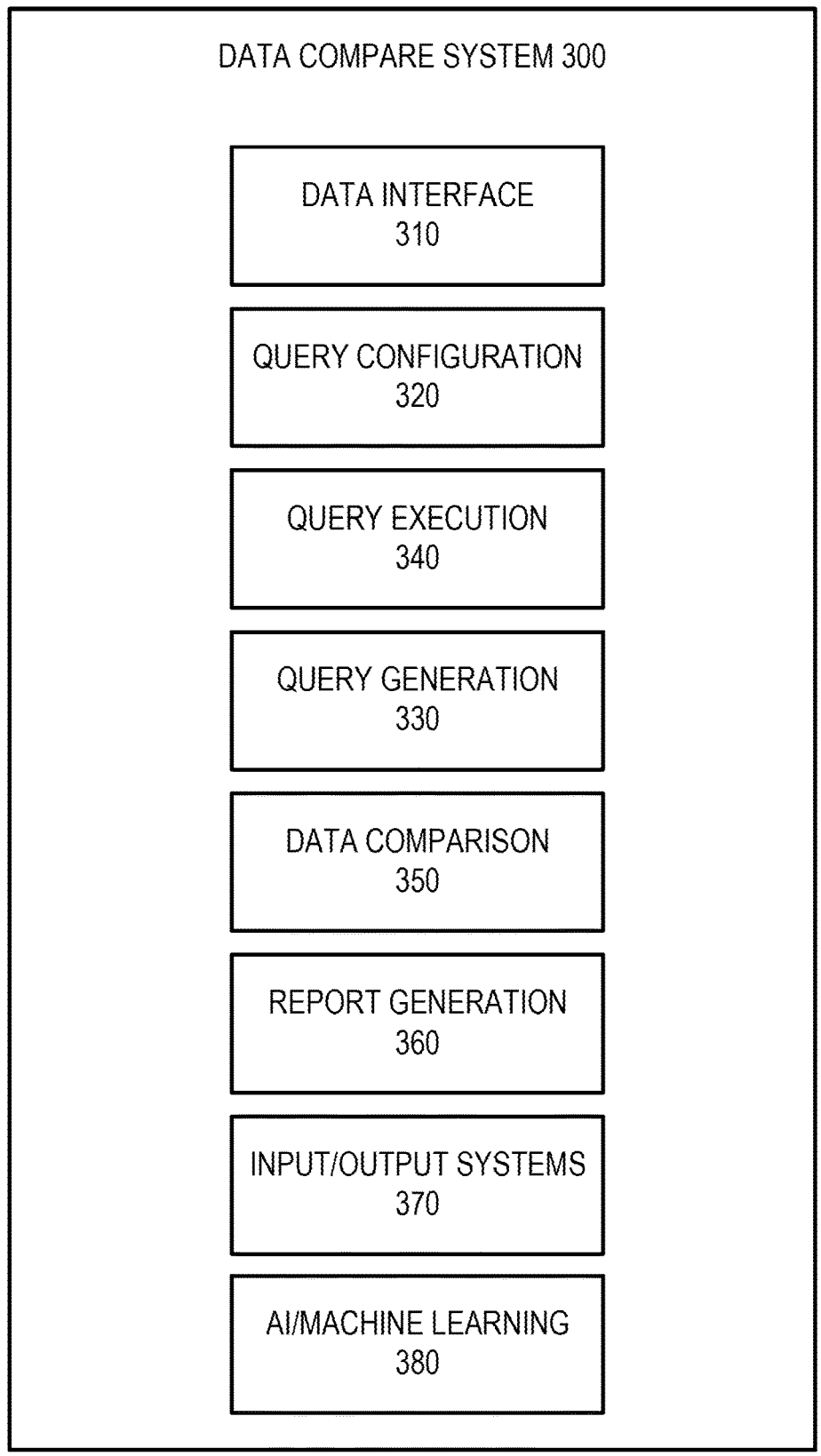
FIG. 3A depicts aspects of a data compare system in accordance with aspects described herein.

FIG. 3A depicts aspects of a data compare system 300 in accordance with aspects described herein. The data compare system 300 may be an implementation of the data compare system 220 of the data management system 208 of FIG. 2. The data compare system 300 includes several elements, including data interface 310, query configuration 320, query generation 330, query execution 340, data comparison 350, report generation 360, input/output (I/O) system 370, and feedback artificial intelligence (AI) and machine learning 380. In other implementations, other configurations or systems can be used. For example, in some implementations, an output system (e.g., output 290) may take data from a data compare system 220 and perform the operations of report generation 360, data comparison 350, or other such operations, rather than integrating such operational systems into the data compare system 220 as described in the data compare system 300. In other implementations, other separations or configurations of systems can be used to implement the features described herein.

The data interface 310 manages reception of data from one or more data sources (e.g., data sources 210). Such reception can be managed in conjunction with I/O systems 370 and associated network or communication protocols to retrieve data from an identified source or multiple sources if a validation is occurring for data sets in different source locations. This can include both similarly formatted data sets from different memory devices, different databases, or different systems, as well as differently formatted or sourced data sets (e.g., from Oracle™, SQL, Informix™, CSV, or any combination of such sources.) The data interface 310 manages the data received at the data compare system 300 from such different sources, and manages storage of such data while it is prepared for comparison and validation operations. As described above, in some implementations, the data set at a data source (e.g., data sources 210) may be changing from real-time inputs as the validation is occurring. In such systems, data interface 310 can manage a current set of data, as well as any updates received while a validation is occurring, to prevent errors or configuration issues with the data included in a validation operation.

The query configuration 320 element manages queries that are sent to data sources involved in a validation operation. When a data validation operation is initiated using a data compare system such as the system 300, the data locations (e.g., sources) are identified in the initiating request. Such an initiating request can include the location, and may either directly or indirectly include information about the data. If the information about the data is not directly included in the initiating request, the data compare system 220 may use configuration properties and/or data source configuration information settings that are internal to the data compare system 300 to identify information about the data. In other implementations or for direct inclusion of such information in the initiating request, configuration properties and data source configuration information (e.g., configuration properties 222 and data source configuration 224) information can be included with the initiating request. Such information can be used to organize a structure of queries to the data sources containing the information. Query configuration 320 can structure not only the specific information (e.g., request strings communicated via a data connection), in the requests, but can organize an overall structure for the complete comparison, including request portions that are sent separately to manage independent parallel comparison operations. Such configurations can manage both the structure of the parallel comparison subsets of data, but the request timing to limit memory storage used within the data compare system 220 while maintaining comparison throughput matching the available processing resources. In particular, for large data sets as described above (e.g., billions of rows of data), leveraging the data sources to manage the incoming data and avoid completely duplicating all data within the data compare system 300 can improve system efficiency and reduce power usage and needed storage resources to accomplish the same comparison operations.

Once the structure of queries for a compare or validation operation is set, the timing and subdata sets for individual comparison operations can be passed to query generation 330 for actual generation of the queries. Such queries can then be set in a stack or other management system for transmission to the data sources by query execution 340. Query configuration 320, query generation 330, and query execution 340 can additionally work with management systems of data interface 310 and I/O systems 370 to manage the execution of data queries and the expected response communications to avoid overwhelming the communication channels and the memory storage of the data compare system 300.

As responsive communications are received from data sources (e.g., following execution of queries for a validation/comparison operation), the data comparison 350 systems take the data and perform comparisons. Examples of data from such a comparison is illustrated below in FIG. 4. In some implementations, data comparison 350 can include multiple processing systems for performing comparison of different subsets of data in parallel. The data comparison 350 system can then generate independent outputs of data from the parallel comparisons, or can integrate the data into a single output.

The output, whether separate outputs from parallel comparisons or a unified comparison output is then structured by report generation 360 as described further below. All of the information involved in the comparison operations can be managed in and out of the data compare system 300 by I/O systems 370, which can include systems such as input device 1622, output device 1624, and communication interface 1626 of FIG. 16. For example, data from report generation 360 can provide feedback to artificial intelligence (AI) and machine learning 380. For example, when report generation 360 outputs report data, additional analysis from AI/machine learning 380 can perform an initial analysis. The analysis can, for example, include a neural network analysis of some or all identified mismatch, and suggest a correct data value associated with the mismatch. Such an output can, for example, include one or more suggested values associated with the mismatch, a confidence score associated with each suggested value, a review suggestion (e.g., a person or group for review of the mismatch), or other such suggestions. As mismatches are identified and corrected, the mismatch and correction values can be used as training data to update the AI/machine learning 380 systems. Such systems can, for example, be convolutional neural networks trained on an initial set of mismatch and correction data, with continuous training provided as mismatches are identified and corrected during operation of the data compare system 300. In some implementations, the training can occur in real-time as comparisons are performed and data values selected for mismatches identified in output reports. In some implementations, different neural networks of AI/machine learning 380 elements can be used for different combinations of input data sources. For example, a set of SQL database entries compared with a CSV file may have an associated AI/machine learning 380 element, and a comparison of Oracle™ data sets against each other may have a different AI/machine learning 380 element. Each pair of data source types can, in such an implementation, have an associated AI system for tracking and identifying suggested data from mismatch history data. In other implementations, a generic AI system may be used unless a specific system is identified as needed for certain combinations of input data sources or data types. In such cases, AI/machine learning 380 elements can be generated for the identified sources (e.g., combinations of types of data sources 210) or data types (e.g., transaction data, medical record data, search data, etc.).

Figure 3B:
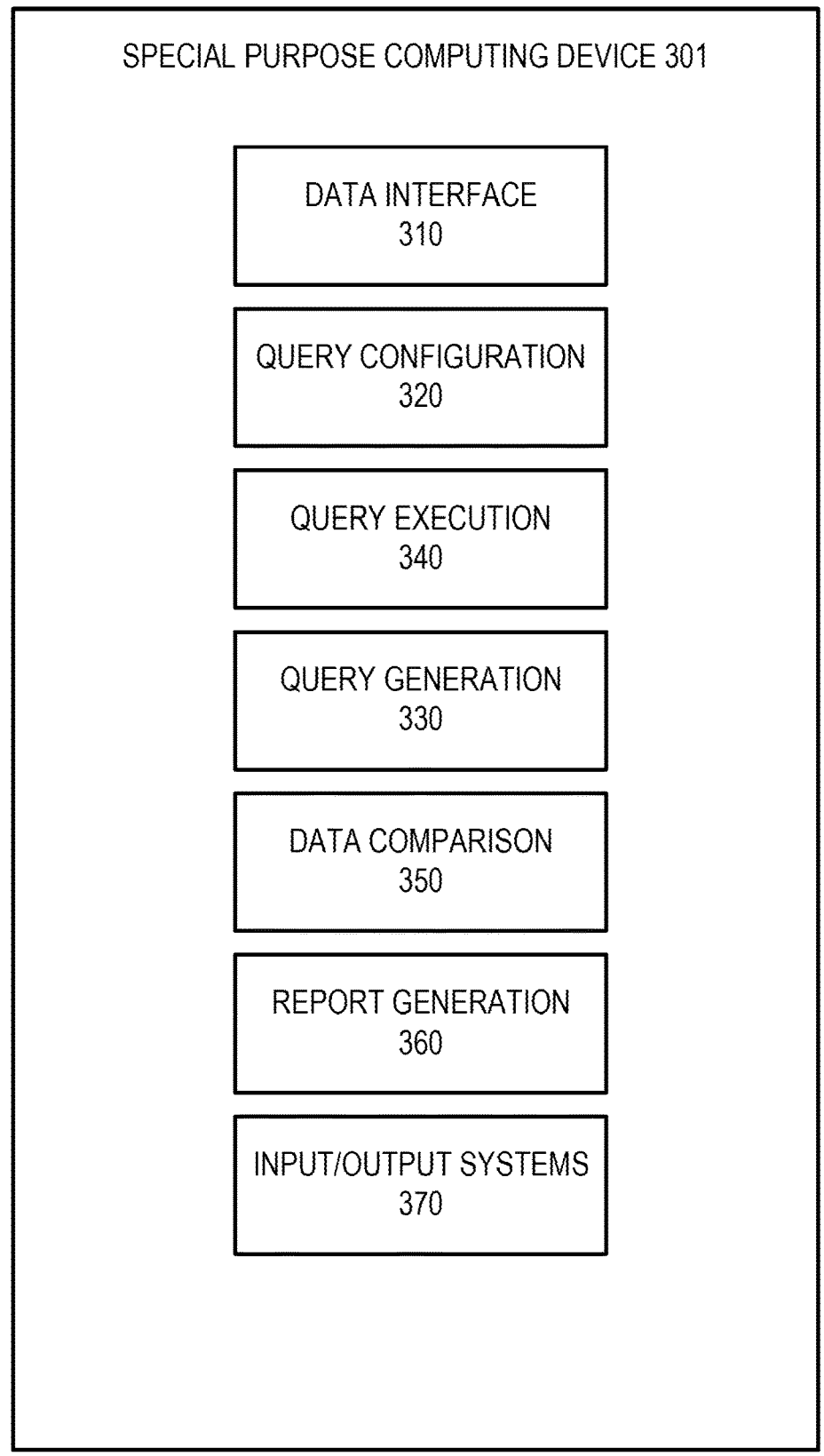
FIG. 3B depicts aspects of a data compare system in accordance with aspects described herein.

FIG. 3B illustrates a special purpose computing device 301 with elements similar to the elements described above. Either the special purpose computing device 301 or the data compare system 300 can be implemented using computing hardware elements as described herein, such as any combination of computing hardware elements of FIG. 16 described below.

Figure 4:
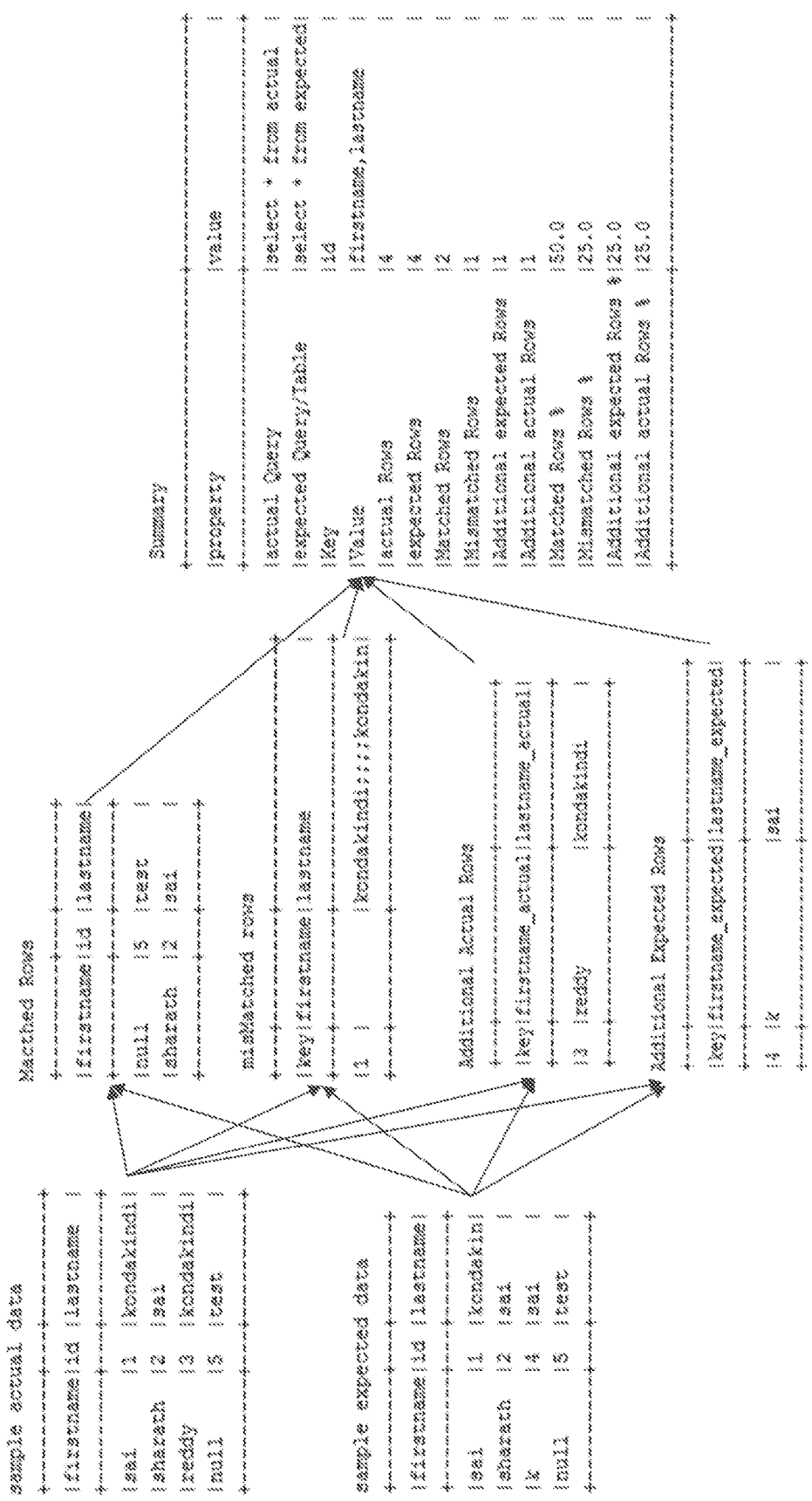
FIG. 4 illustrates aspects of data validation in accordance with aspects described herein.

FIG. 4 illustrates aspects of data validation in accordance with aspects described herein. FIG. 4 illustrates an example of a comparison processing, including summary data, an example of data from a data source, an example of expected data (e.g., for data validation comparison operations), and examples of intermediate output data in to form of matched row data, mismatched row data, additional actual row data (e.g., data in the actual data not presented in the expected data being validated), and additional expected row data (e.g., data from the expected data being validated not present in the actual data.

In some implementations, the compare operations may be comparing a destination set of data with an incoming set of data (e.g., validating destination data against incoming data). In some examples, as illustrated, the data may be considered actual (e.g., a first set of data being validated), and an expected set of data (e.g., used for validating the actual data). In other examples, the operations may not have any identification of a destination and incoming set of data, but may simply be comparing two sets of data.

In some aspects, the illustrated summary data can be a summary report explaining the validation process including source queries, counts, and metrics regarding the comparisons (e.g., percentages of mismatch elements, mismatch rows, confirmed rows, etc.) The intermediate output data is illustrated as having a single intermediate layer, but in other implementations, detailed metrics and/or feedback structures for AI/machine learning may be implemented in multiple tiers of analysis and intermediate data. In various implementations, any such combinations of output data may be generated, and as described above, some feedback systems may be implemented to input such data to a network that outputs additional intermediate data (e.g., suggestions and confidence for values where a mismatch occurs.) In other implementations, any other such data may be included.

The illustrated matched row data describes rows which are identical between actual and expected (e.g., destination or validating) data. The mismatched row data include information on rows where key information exists in both sides (e.g., actual and expected), but at least one column value is not matching between a source row and an expected row. Columns which are matching are shown as empty fields and columns which include differences will be populated by separators with actual column values and expected column values. In some implementations, the values may be character difference values formatted in any form to communicate details of the mismatch. As shown, additional actual rows illustrate rows which are existing in actual data but not in expected data. The additional expected rows include rows which are exiting in expected data but not present in actual data. FIG. 4 illustrates example data, but any form or formatting of output data can be used in various implementations.

Figure 5:
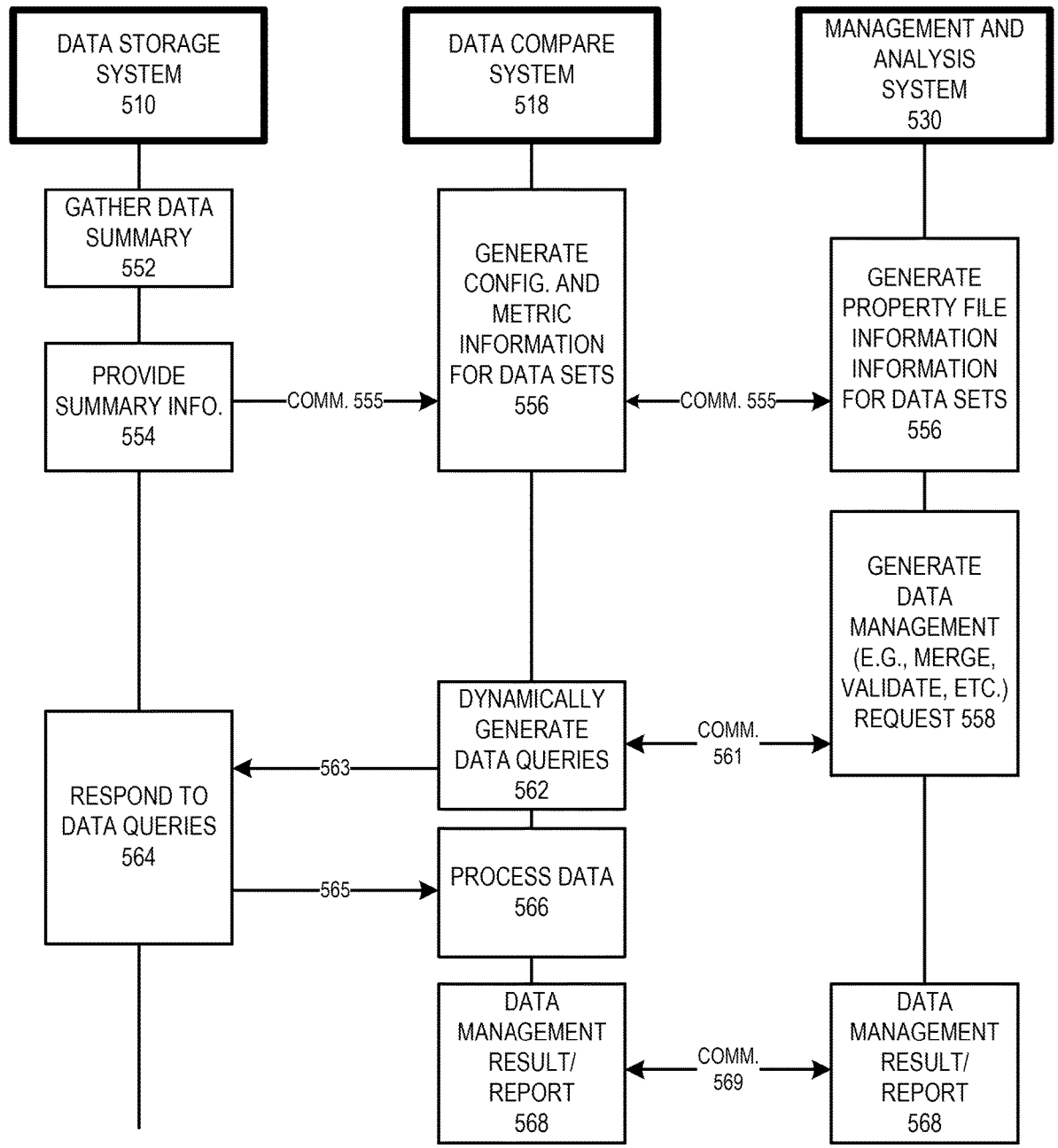
FIG. 5 depicts aspects of a system and system operations in accordance with some examples.

FIG. 5 depicts aspects of a system and system operations in accordance with some examples. FIG. 5 includes an illustration of a data management system (e.g., similar to data management system 208). The data management system of FIG. 5 includes a data storage system 510, a data compare system 518, and a management and analysis system 530. In some implementations, the data storage system 510 can be one or more of the data sources (e.g., data sources 210). In other implementations, the data storage system 510 can be an intermediate data source that stores or gathers data for validation from original creators or aggregators of the data (e.g., a customer or originating system that creates the data sets). As described above, some data sets may be updated in real-time based on actions occurring within a system. Data storage system may either fix a set of data, or be an intermediate system that includes fixed data with periodic (e.g., instead of real-time) updates, that can be managed discretely by the data compare system 518. Data compare system 518 may be any computing resource capable of comparing sets of data or validating one set of data against another set of data as described herein. The data compare system 518 can be a structured server system, or can be a dynamic cloud resource that allocates processing and memory resources to a validation operation as needed to handle a current amount of parallel data comparisons available and structured as part of a validation operation for two data sets (e.g., as structured by query configuration 320 described above). In different structures, the resources for the management and analysis system 530 can similarly be server or cloud based. Additionally, while data storage system 510, data compare system 518, and management and analysis system 530 are shown structured separately, in various implementations, these systems may be portions of a shared server or cloud resource system, or may be any other such structure or computing system capable of performing the described operations.

Prior to the operations described in FIG. 5, a request or initiating action will occur to initiate a data validation or comparison operation. Such a request may be an input to a data management system, or another such communication. Such a communication may include configuration properties and data source configurations as described in FIG. 2 above, or may rely on default configuration properties and data source configurations, and simply identify the location(s) of data sets to be processed.

Following an initiating action or communication, data is received about the sets of information to be processed, the data is organized at one or more data storage systems 510 in operations 552, and a summary of the data to be processed is generated by the data storage system 510 in operation 554. The summary information describing the data at the data storage system 510 is sent to the data compare system 518 in communication 555. The data compare system and management and analysis system then generate configuration and metric information for data sets to be validated in the requested operation, as part of operations 556. This can include operations to format or manage the data prior to the comparison operations. For example, if one set of data includes duplications or initial data structure or data integrity issues, an initial set of operations can be structured. Based on the structure of the initial operations, the data management operations are also structured. These can include operations to validate a data set against another data set, merge two data sets to generate a merged data set, or to perform such operations for any number of data sets (e.g., merging and/or validating three or more sets of data).

Once the structure of the data management operations is set in operations 558, the information associated with such structures is provided to the data compare system 518, which dynamically generates data queries in operations 562. The dynamic query generation, as described above, can include structured subsets of data requested independently to allow parallel processing of subsets of the overall data sets. The dynamic query generation can also include time-based management of the issuance of such queries to avoid overwhelming the available processing resources of the data compare system 518. The queries, as structured into subgroups and distributed in time, are communicated in communications 563 to the data storage system 510. In operation (s) 564, the data storage systems 510 respond to the queries in communications 565, which include the time-based subsets of data to be compared. The subsets of data are processed against corresponding subsets in operation 556, and data management results and reports are generated in operations 568 and communications 569.

Figure 6:
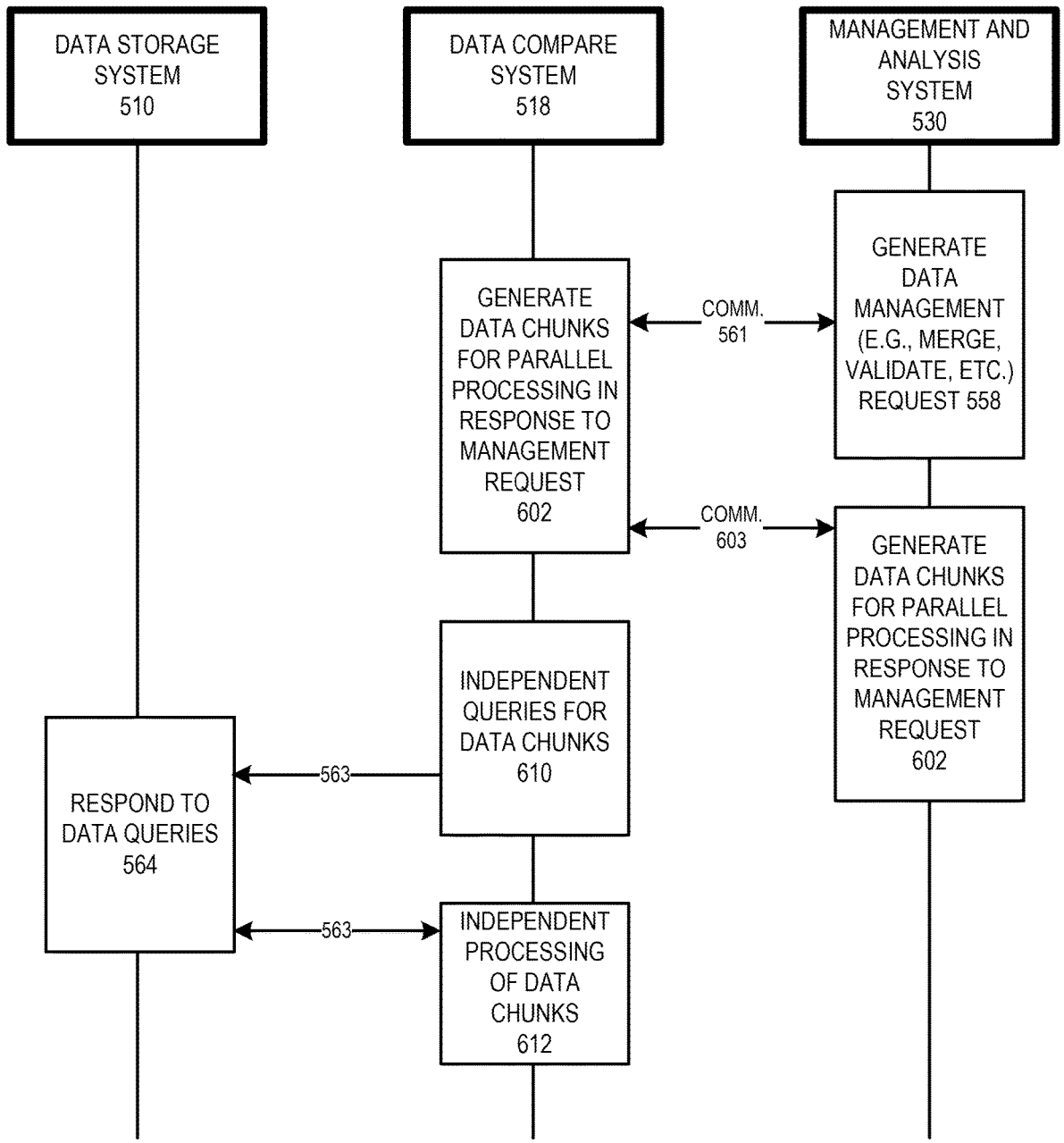
FIG. 6 depicts aspects of a system and system operations in accordance with some examples.

FIG. 6 depicts aspects of a system and system operations in accordance with some examples. FIG. 6 includes the systems of FIG. 5, and the descriptions of data storage system 510, data compare system 518, and management and analysis system 530 from FIG. 5 apply to FIG. 6 as well. The operations of FIG. 6 may be performed separately from the operations of FIG. 5, or may be performed in conjunction with the operations of FIG. 5. In FIG. 6, operation 558 involves data management operations 558 as described in FIG. 5, but the communication 561 of data for the management is then used by data compare system 518 to identify corresponding subsets of data within the overall sets of data that can be compared independently. The identification of these corresponding data chunks (e.g., subsets) that can be compared, merged, or validated in parallel and then combined in the final output analysis, are identified in operation 602 and communication 603, and separate independent queries for the corresponding data chunks are communicated in operation 610. The response operation 564 from the data storage system involves the separate data chunks, and the responsive data is processed independently in operation 612 to create the validation or comparison results for the independent chunks of data.

Figure 7:
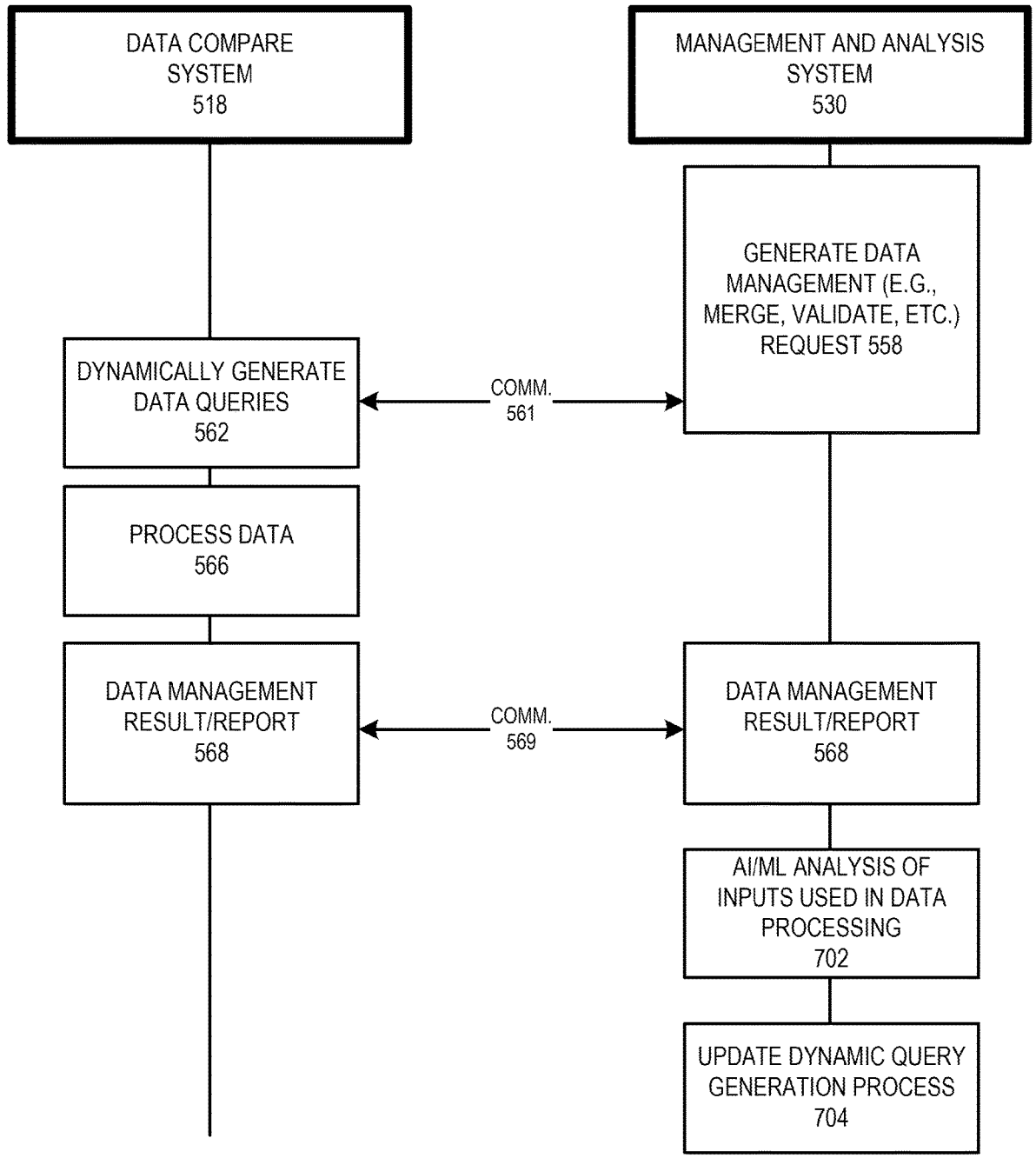
FIG. 7 depicts aspects of a system and system operations in accordance with some examples.

Similar to FIG. 6, FIG. 7 depicts aspects of a system and system operations in accordance with some examples. FIG. 7 includes the systems of FIG. 5, and the descriptions of data storage system 510, data compare system 518, and management and analysis system 530 from FIG. 5 apply to FIG. 7 as well. The operations of FIG. 6 may be performed separately from the operations described above, or may be performed in addition to the operations described above.

Operations 558, 562, 566, and 568 are performed as described above, but FIG. 7 additionally includes AI/machine learning analysis. The analysis of operations 702 can include an analysis of the dynamic queries used in operation 562, and a feedback machine learning system can be used to identify any issues with queries and responses for sets of data or types of data. Such learning can then be fed back into future data query organization or generation of queries to avoid query issues in future comparisons as part of an update in operation 704.

Figure 8:
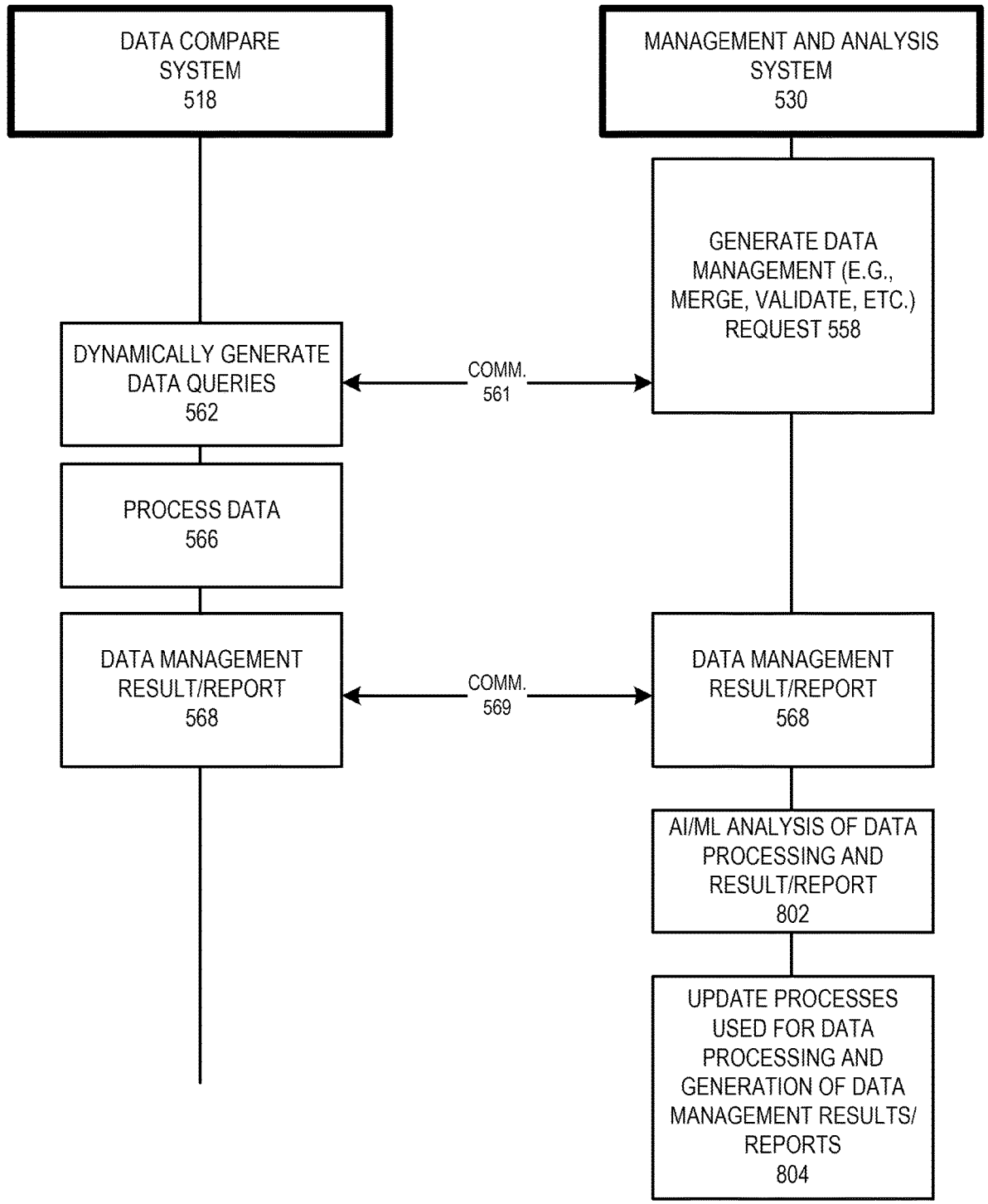
FIG. 8 depicts aspects of a system and system operations in accordance with some examples.

FIG. 8 illustrates additional AI/machine learning operations similar to those of FIG. 7. Just as with FIG. 7, the operations of FIG. 8 may be performed separately from or in addition to the operations above. Operations and communications 558, 561, 562, 566, 568, and 569 proceed as described above. In operation 802 some systems may perform AI/machine learning analysis on mismatch data as described above. For example, after an output report is generated, a system may allow merge or validation operations to accept an input selecting a correct value associated with the mismatch data. Machine learning systems can use this information in update operation 804 to create a tool for automated selection of an expected correct value for future comparison or validation operations. As described above, such a tool may be structured as a neural network that accepts mismatch data as an input, and either selects between the inputs with a confidence score that the selected value is correct, or may recommend an expected correct value (e.g., which may be different than either compared value for the mismatch). Such analysis and feedback may be performed on any aspect of data comparison described herein to improve the data processing and result/reporting of outputs.

Figure 9:
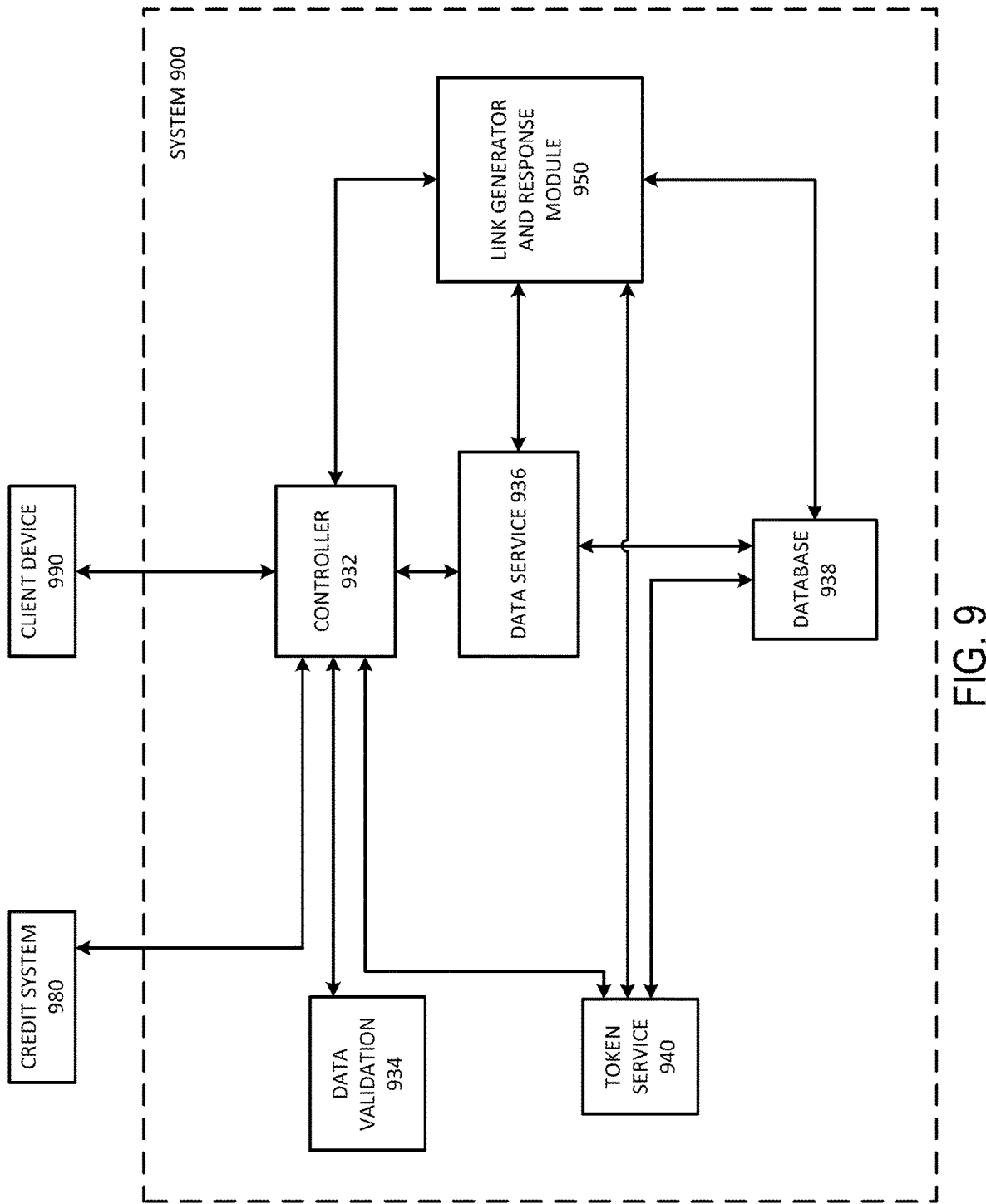
FIG. 9 shows illustrative aspects of a system for token service that can be used with data validation in accordance with aspects described herein.

FIG. 9 describes a system 900 including an example implementation of a link generator and response module that may be used for secure communication and tracking of data communications in accordance with aspects described herein. In some implementations, data involved in validation operations described herein may be subject to privacy or security restrictions for data used by credit system 980 and client device 990, and a data service 936 managing such data may use a link generator and response module 950 with a data validation system 934 (e.g., similar to any data validation systems of FIGS. 2-8 above) to manage data security during validation or comparison operations. The system for token service can be used with data validation in accordance with aspects described herein. While FIG. 9 shows one implementation, it will be apparent that other implementations are possible. The example of FIG. 9 includes a token generator and validator, a response service, and a communication channel selection system for selecting between different channel options for communication of a secure one-time link. The token generator and validator can have a connection to a controller 932 to receive a communication initiating token and secure one-time link generation. The token generator and validator can also connect to data service 936 and token service 940 to allow verification of a received one-time link and an update to prevent the one-time link from being reused. The response service can communicate with the token generator and validator to store appropriate information in a database such as database 938 for future verification and to prevent one-time link reuse.

For systems that allow different channels for communication of a one-time link to a customer, the link generator and response module includes circuitry for switching delivery methods. In the illustrated implementation of FIG. 9, switch delivery method includes circuitry to select between a communication channel for sending a one-time link to a customer via a merchant system, sending a one-time link to a customer directly via email, or sending a one-time link to a customer via SMS. Each delivery method can include different circuitry for generating appropriate secure communications in the selected channel with the secure one-time link. When the appropriate communication is generated, the controller can receive the information via the corresponding output of the link generator and response module. The controller then routes the secure one-time link to the user via the selected delivery channel for communications with credit system 980 and client device 990. In some implementations, the request data identifies the channel, and the channel is selected by parsing the request data. In other implementations, the link generator and response module selects from multiple available options based on data from a data service.

Figure 10:
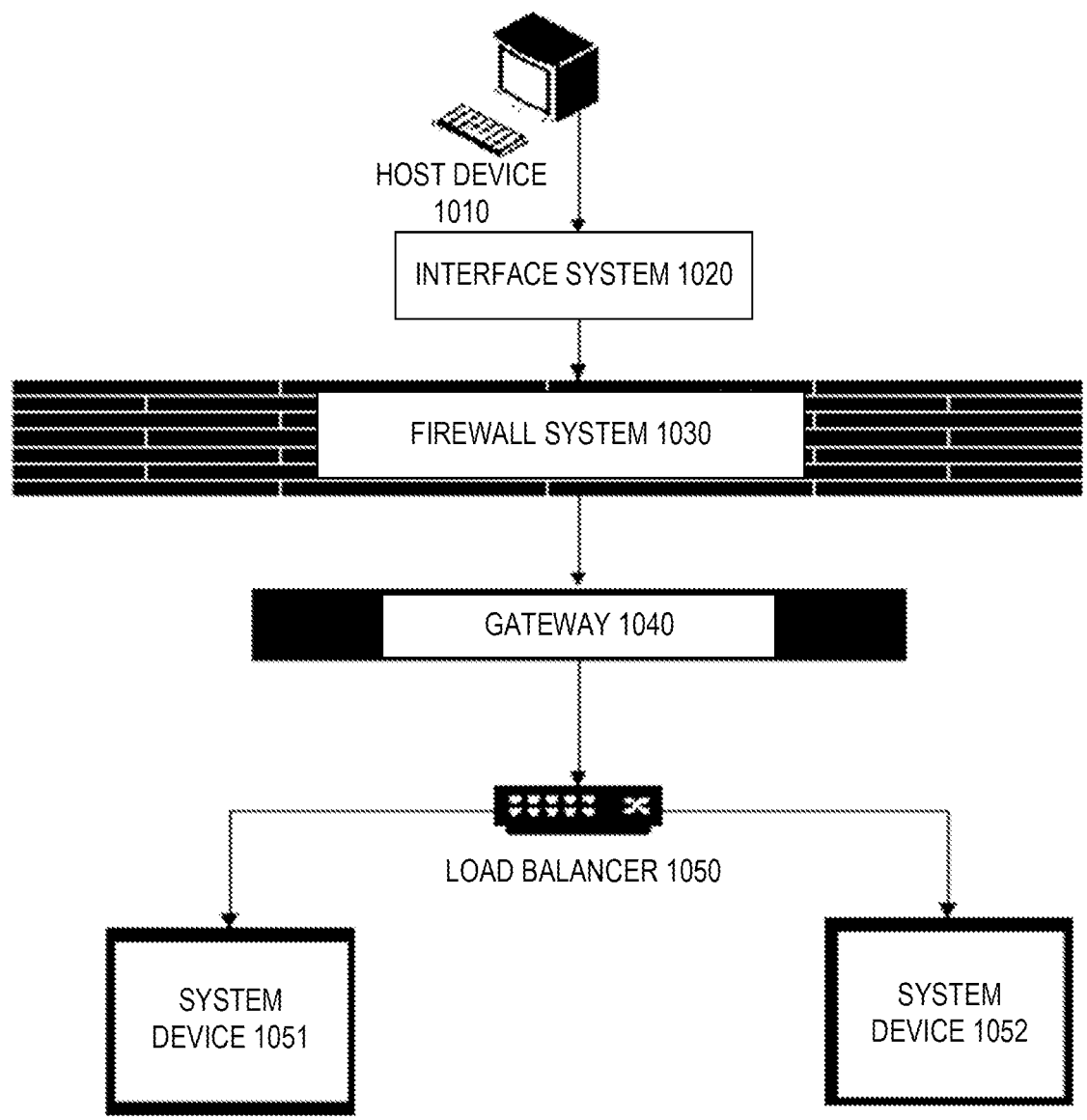
FIG. 10 illustrates aspects of a network system in accordance with aspects described herein.

FIG. 10 illustrates additional aspects of network data management in accordance with at least one embodiment. FIG. 10 includes interface system 1020 (e.g. an interface system) for interacting with a host device 1010 (e.g. a retail computer system) and protecting an authentication system that can include system devices 1051 and 1052. In particular, for a data management system protecting secure data, interface system 1020 can be one layer in a multi-layer secure management system for allowing a retail system and customer devices, such as host device 1010, to communicate with secure data stored in the devices of the system, including system device 1051 and 1052. The interface system 1020 can thus be separated from system devices 1051 by a firewall system 1030, a gateway system 1040, and a load balancer system 1050. The interface device can provide tokens to devices such as host device 1010 to authorize communications. Such a token, however, may not provide sufficient protection, and firewall system 1030 can include additional protections, including analyzing incoming requests for patterns of malicious attack or improper communications. Further, some systems can be configured for large numbers of requests, and so request data for high volumes and different distributions of geographic locations originating different requests can be managed by gateway system 1040 and load balancer system 1050, which can route request data to different system devices such as system device 1051 and system device 1052 based on incoming data and performance of different devices in a system.

FIG. 11 is a flow diagram illustrating an example method 1100. Method 1100 can be performed by one or more processors of a server computer or server system as part of a data management system (e.g., the data management system 108, 208, etc.). Method 1100 can, in some examples, be implemented as computer readable instructions that, when executed by processing circuitry of a device, cause the device to perform steps of method 1100. In other implementations, any other such structures or device elements including means for performing the operations of method 1100 can be used.

Operation 1102 of method 1100 includes generating a configuration file, the configuration file including dynamic matching data describing a first plurality of data entries and a second plurality of data entries.

Operation 1104 of method 1100 includes generating a data action file, the data action file identifying a first data set including the first plurality of data entries, a second data set including the second plurality of data entries, a key type, and a value structure associated with the key type, where the first data set and the second data set are stored in a data source system, where the first plurality of data entries includes first data fields, and where the second plurality of data entries includes second data fields.

Operation 1106 of method 1100 includes dynamically generating a plurality of data queries including key type queries, value structure queries and dynamic value structure queries, where the dynamic value structure queries are generated in real-time based on the dynamic matching data indicated in the configuration file, and where the dynamic value structure queries being generated based on a first data type, a second data type, and data field types present in the first data set and the second data set.

Operation 1108 of method 1100 includes dynamically executing the plurality of data queries in parallel, where parallel execution of the plurality of data queries includes a plurality of simultaneous data queries to the data source system including the first data set and the second data set.

Operations 1110, 1112, and 1114 then include operations for using the outputs from the parallel query execution in operation(s) 1108. Operation 1110 includes matching fields of the first plurality of data entries and the second plurality of data entries using the key type and the value structure. Operation 1112 includes identifying corresponding fields of the first data fields and the second data fields having a data mismatch. Operation 1114 includes automatically generating a mismatch database entry for the corresponding fields having the data mismatch.

In addition to the above operations, some implementations can operate with alternate or additional configurations. For example, some implementations may function where the first data set includes at least one billion data fields, and where the second data set includes at least one billion data fields. Other implementations may operate with different numbers of data fields, but the examples described herein include a benefit of parallel processing that allows validation handling of large numbers of data values that would take excessive amounts of time in other systems. Similarly, some implementations may operate where the first data set comprises at least a terabyte of data, and where the second data set comprises at least a terabyte of data. Aspects described herein can handle such relatively large amounts of data in a time period (e.g., minutes, hours, or fewer than 7 days) that allows for responsive interactions with client systems to integrate data, where data fields are not an exact match, and when large amounts of data are involved. Additional implementations can operate where the configuration file further identifies the first data type for the first data set and the second data type for the second data set.

FIG. 12 is a flow diagram illustrating an example method 1200. Just as with method 1100, method 1200 can be performed by one or more processors of a server computer or server system as part of a data management system (e.g., the data management system 108, 208, etc.). Method 1200 can, in some examples, be implemented as computer readable instructions that, when executed by processing circuitry of a device, cause the device to perform steps of method 1200. In other implementations, any other such structures or device elements including means for performing the operations of method 1200 can be used. In some implementations, the method 1200 can be combined with the method 1100 or certain operations (e.g., operations 1102 through 1110 prior to operation 1202) to form an independent method. In additional implementations, any other such combinations, including repeated and intervening operations, can be integrated with the described operations.

Method 1200 includes operation 1202, which involves generating the configuration file associated with the first data set, where the configuration file further indicates values used for generation of the dynamic value structure queries, and where the configuration file is generated using a machine learning algorithm trained from mismatch database entry training data.

Operation 1204 involves generating a feedback value associated with the mismatch database entry, where the feedback value identifies a difference between an expected result and an actual result in the mismatch database entry, where the feedback value is associated with settings in the configuration file.

Operation 1206 involves updating the mismatch database entry training data and the machine learning algorithm using the feedback value and the mismatch database entry to generate update mismatch database entry training data. Some such methods can further involve operations using a machine learning algorithm to generate a dynamic query selection table using mismatch training data, where the dynamic value structure queries are selected from the dynamic query selection table. Other such methods can include operations for processing the mismatch database entry to generate a mismatch report providing mismatch metrics for values of the corresponding fields of the first data set and the second data set, or for processing the mismatch database entry using a machine learning algorithm to remove mismatch data where the corresponding fields for the first data set and the second data set include matching content with data mismatches.

Additional operations that can be integrated with the operations for method 1100 or method 1200 include operations for identifying different tiers of matching standards for different corresponding fields of the first data set and the second data set, and operations for merging the first data set and the second data set, where merging the corresponding fields of the first data fields and the second data fields having the data mismatch comprises a multi-tier machine learning algorithm for merging entries having identical key values with mismatched fields.

Similarly, some methods can additionally include operations for identifying corresponding chunks of data from the first data set and the second data set; where dynamically executing the plurality of data queries in parallel includes generating separate data chunks for independent parallel processing using the corresponding chunks of data from the first data set and the second data set, and where identifying the corresponding fields of the first data fields and the second data fields having the data mismatch is performed separately on the separate data chunks for the corresponding chunks of data from the first data set and the second data set. Some such operations can function where the plurality of data queries are queries for the first data set and the second data set, where the key type queries are for fields of the first data fields and the second data fields associated with the key type, and/or where the dynamic value structure queries are for fields of the first data fields and the second data fields not indicated by the data action file. In other operations, the method may function where the configuration file is generated as the first plurality of data entries and the second plurality of data entries are being received.

Figure 13:
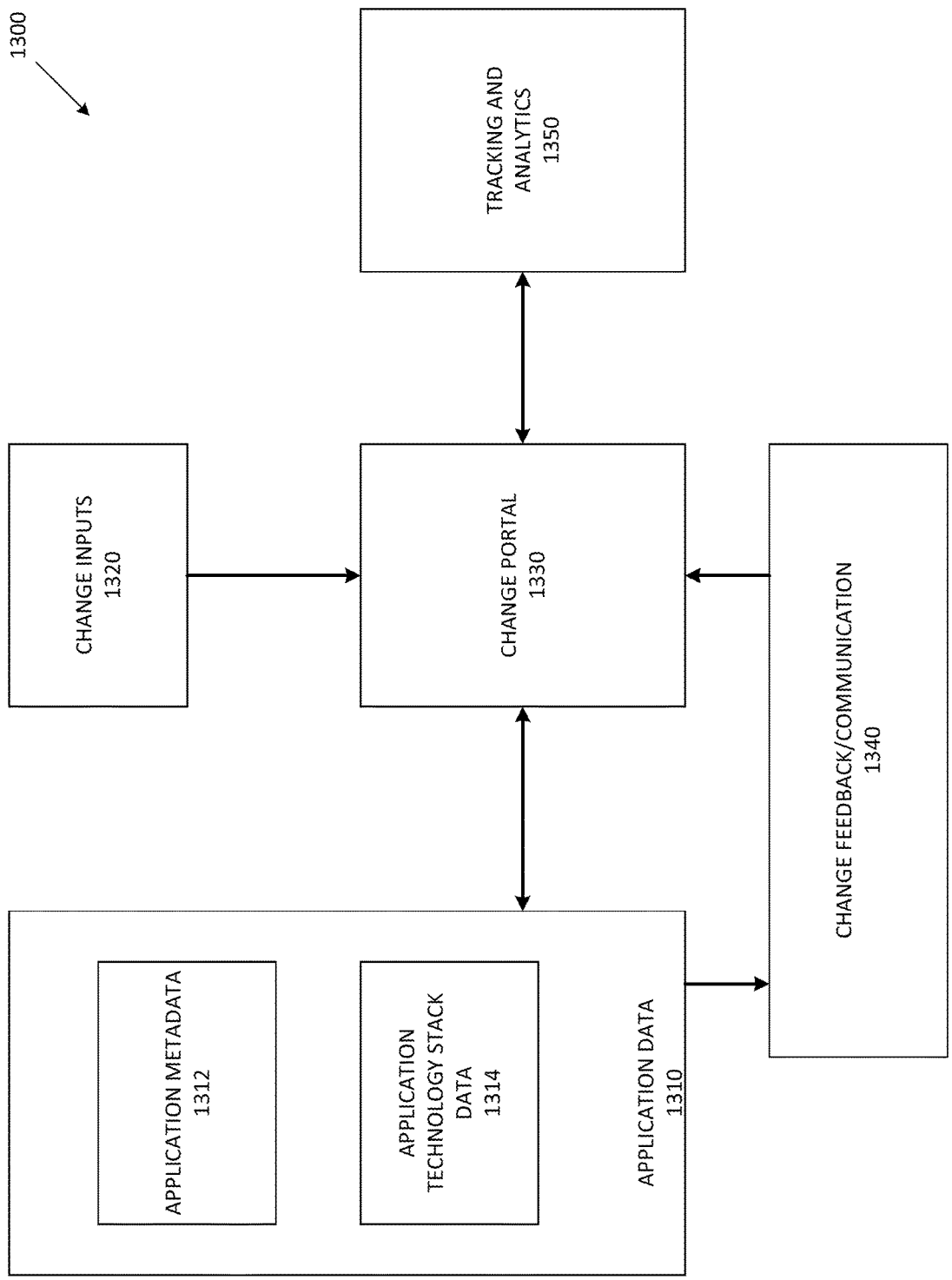
FIG. 13 illustrates aspects of an enterprise job portal system in accordance with aspects described herein.

FIG. 13 illustrates aspects of an enterprise job portal system 1300 in accordance with aspects described herein. In complex and large data environments as described above, the technology, software, and software support stacks used to generate data and implement applications that generate data are complex and ever changing. Such system and system changes impact not only the technical function of software, but governance, compliance, maintenance, privacy and security, and other such system considerations.

Aspects described herein segregate system meta data from application technology stack information for control of compliance and governance features of a system. Such a separation improves system operation and the function of devices with a system by allowing inclusion of open-source support with flexible and transparent governance and compliance checks and systems. Such benefits can be compared with licensed products that track technology changes without managing governance, compliance, and maintenance restrictions in a flexible and transparent manner.

Examples of items managed in such a system include technology (e.g., application) team members, technology inputs (e.g., technology stack or support systems for an application), data management, downstream (e.g., dependent) platforms, structures for job communications (e.g., subscriptions to job communication), change tracking systems, data cataloging, meta data tracking, etc. Aspects described herein include a portal system 1300 that allows creation, configuration, and analysis at job and environment levels. The portal system 1300 can support change tracking, communication, and feedback for multiple application systems. Each application system supported by the portal system 1300 can include information for but environment level details and job level details. Job level as referred to herein includes any change or action associated with an application or technology environment, and can include goal oriented projects including multiple expected changes or actions. Environment level as referred to herein includes a technology environment, which can be application based, platform based, structured around one or more technologies or systems in a technology stack, or any such system level structure. An environment level tracked by the portal system 1300 can, for example, be a standardized user interface used in the technology stack for multiple applications, an application programming interface used by an application, etc. The system 1300 allows users, such as data engineers, developers, data scientists, operations and analyst personnel, and other such individuals operating within job or environment teams to create and configure jobs (e.g., actions or groups of actions), without following an offline change management process. Such job tracking can increase transparency, and can allow job and environment dependencies to be flagged and tracked as changes occur. Such a structure can allow rapid change with tracking transparency for correction of change errors, without bringing change momentum to a crawl with significant change management overhead that is part of a comprehensive change management process.

The system 1300 can additionally implement transparency with a communication subscription model that notifies subscribers of pending changes for jobs or environments that impact the subscriber. Such user managed subscriptions can enable transparency and additional tracking, without automatic no-action veto or halt-approval structures that can slow change action. Instead, subscriptions can allow active veto or review procedures based on environment level communications when subscribers identify potential issues through transparent communications. Additionally, the system 1300 can provide features and system improvements not available in existing control systems, such as the ability to view and add meta data to job or environment tracking systems, perform independent impact analysis for changes at job and environment levels, and use data streaming and parameters from a system while running jobs.

The system 1300 includes an application data 1310 system (e.g., one or more databases or memory and data storage systems), a change portal 1330 system, a change input 1320 system, a change feedback and/or communication 1340 system, and a tracking and analytics system 1350. As described above, modern application development systems can rely on both local application development (e.g., associated with local application metadata), as well as leveraging technology environments in an application technology stack (e.g., one or more environments leveraged for an application and associated with application technology stack data 1314). The interrelated dependencies between various parts of an application (e.g., either completed or in development) as well as dependencies on the environments in the technology stack creates dependencies where changes in one element can impact elements with a downstream dependency on the changing element.

Figure 14:
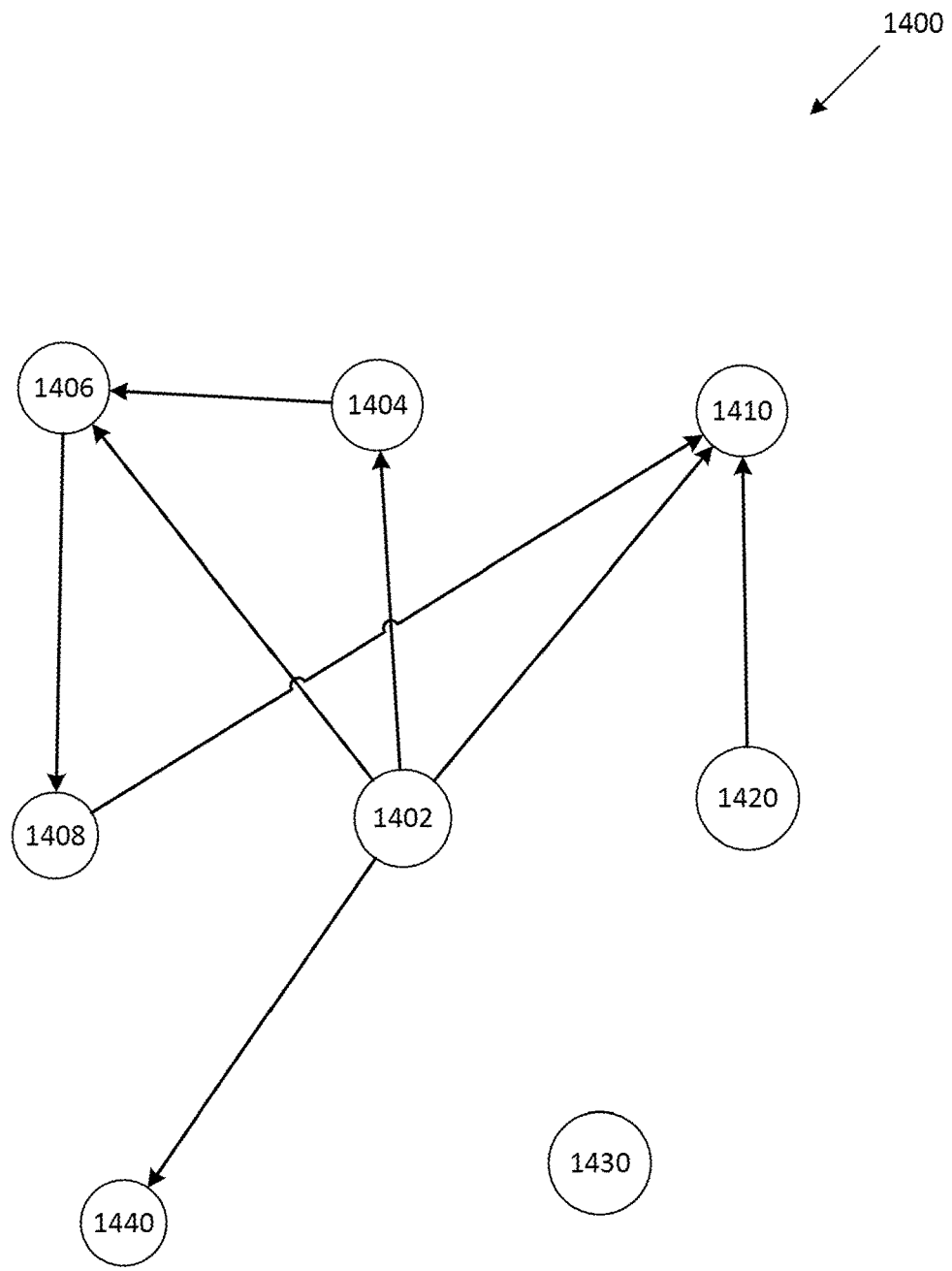
FIG. 14 is a dependency diagram illustrating aspects of system dependencies for an application environment in accordance with aspects described herein.

FIG. 14 is a dependency diagram illustrating aspects of system dependencies for an application environment 1400 in accordance with aspects described herein. Application environment 1400 includes a number of application elements 1402, 1404, 1406, 1408, 1410, 1420, 1430, and 1440. As described above, each of the elements may be a job, and independent element of an application, or an environment in an application stack that is used for the application. During development, the elements may be jobs that are part of in-process development that include dependencies. In the illustrated environment 1400, element 1430 is independent, meaning that it is not dependent on any other elements, and that no other elements depend from element 1430. Elements 1402, are similarly not dependent on any other elements, but other elements are dependent on them. Element 1410 depends on element 1420, and elements 1404, 1406, 1410, and 1440 depend directly from element 1402. In addition to these direct dependencies, elements 1406, 1408, and 1410 also have indirect dependencies, meaning that while changes to element 1402 do not directly impact element 1408, changes to element 1402 may still indirectly impact element 1408 via the chain of dependencies through elements 1404 and 1406.

Such dependencies can impact an application environment both during operation, where changes may cause downstream issues (e.g., issues with elements that depend on the chaining elements), and during development prior to operation. Prior to operation, jobs represented as elements in an environment may depend from one another, with a possibility of job failure impacting the ability of the application to transition to an operational state. Without a management system, application element owners (e.g., job owners or application environment owners) manually inform downstream contacts regarding changes (e.g., via email or meetings). Such manual tracking can result in a lack of transparency, inefficiency, and issues with multiple dependencies. Aspects described herein use application metadata 1312 and application technology stack data 1314 to track such dependencies along with change and failure information in order to improve system operation.

System 1300 can then use the application data 1310 with change inputs 1320 (e.g., information about job failures, environment updates, jobs with application change goals, etc.) to facilitate communication, feedback, tracking, and analytics via a change portal 1330, change feedback and communications 1340, and tracking and analytics system 1350. The change portal 1330 can be a web or application management interface for tracking change status, change impacts, and development planning around such impacts. The change portal 1330 can manage both information about changes, and communications between application element owners (e.g., individuals responsible for jobs and/or technology stack environments used for an application) regarding a particular application. When change inputs 1320 are received via the change portal 1330, the change inputs will identify an application element associated with the change. The change portal 1330 includes processing elements that can gather the application metadata 1312 or the application technology stack data 1314 from application data 1310 that is relevant to the element identified in the change input 1320. The retrieved data will have information on downstream dependencies, and contact information for the owners of the application elements downstream from the changing element. The change portal 1330 can be used to automatically contact these owners with a notification of the change. The notification can include details on the change, along with automatically identified details on the expected impact or dependency structure associated with the change. For example, in some situations, an owner may have limited information about the element being impacted, particularly for elements where the change impacts a portion of the application that has been stable for a significant amount of time, or the impacted element is not yet active due to the dependency. The change portal 1330 may use application data 1310 to automatically identify not simply that a dependency exists, but can also include details about how the identified change is expected to impact the downstream element.

Once the dependency identified with contact information in response to a specific change communication is received via the change input 1320, relevant change information can be automatically sent to all contacts responsible for application elements impacted, either directly or indirectly, by the change indicated. Change portal 1330 can then facilitate change management in a variety of different ways. At a basic level, change portal 1330 can provide a history of communications regarding the change management, along with the initial information regarding the change and impacts associated with the change by information from application data 1310. As additional information on the impact of the change and the progress of change implementation occurs, all communications and relevant information associated with the change management can be stored in application data 1310 and made available via the change portal 1330. The record of communications and information about change implementations, updates to change impacts, and downstream changes to deal with the initial change implementation, can all be available via user interfaces of the change portal 1330. As new responsible parties or interested individuals or managers review an application status or change status, the record available by change portal 1330 allows transparency and efficient communications associated with the application environment and changes to the application environment. By storing and presenting information at a change level for an application environment, aspects described herein improve operation of a system by making information of r a change available with fewer device inputs, greater organization, and greater efficiency in communicating and tracking change details.

In addition to tracking all information for individual changes (e.g., communications, updates, quality testing, errors, etc.), the tracking and analytics system 1350 can create milestones and criteria for tracking both individual change actions, and metrics across multiple change actions. While individual changes may have unique characteristics, certain aspects of changes within an application or across multiple applications may have similar characteristics such that comparisons and metrics to allow comparisons across jobs, changes, environments, and applications can be benchmarked and tracked. Such metrics can, for example, include communication and action speed (e.g., communications per time period), error rate per implementation action, process against project or job deadlines, or other such metrics. In addition to objective operation data that can be collected automatically by change portal 1330 as communications and system updates occur, subjective data on system operations, job progress, and job success rates can be tracked by change portal 1330. Tracking and analytics system 1350 can, in some implementations, not only track such information, but can use artificial intelligence and machine learning system to identify patterns in change management. Such patterns and management can be fed back into systems that identify expected impacts in responses to a change input 1320. Such suggestions may occur not only in response to an initial change input communication, but also in response to intermediate change actions or communications. For example, AI/machine learning systems may identify certain communications which occur frequently in positive association with results of actions in a change management, and can either automatically implement such actions or generate recommendations for actions in future change actions with similar characteristics.

Figure 15:
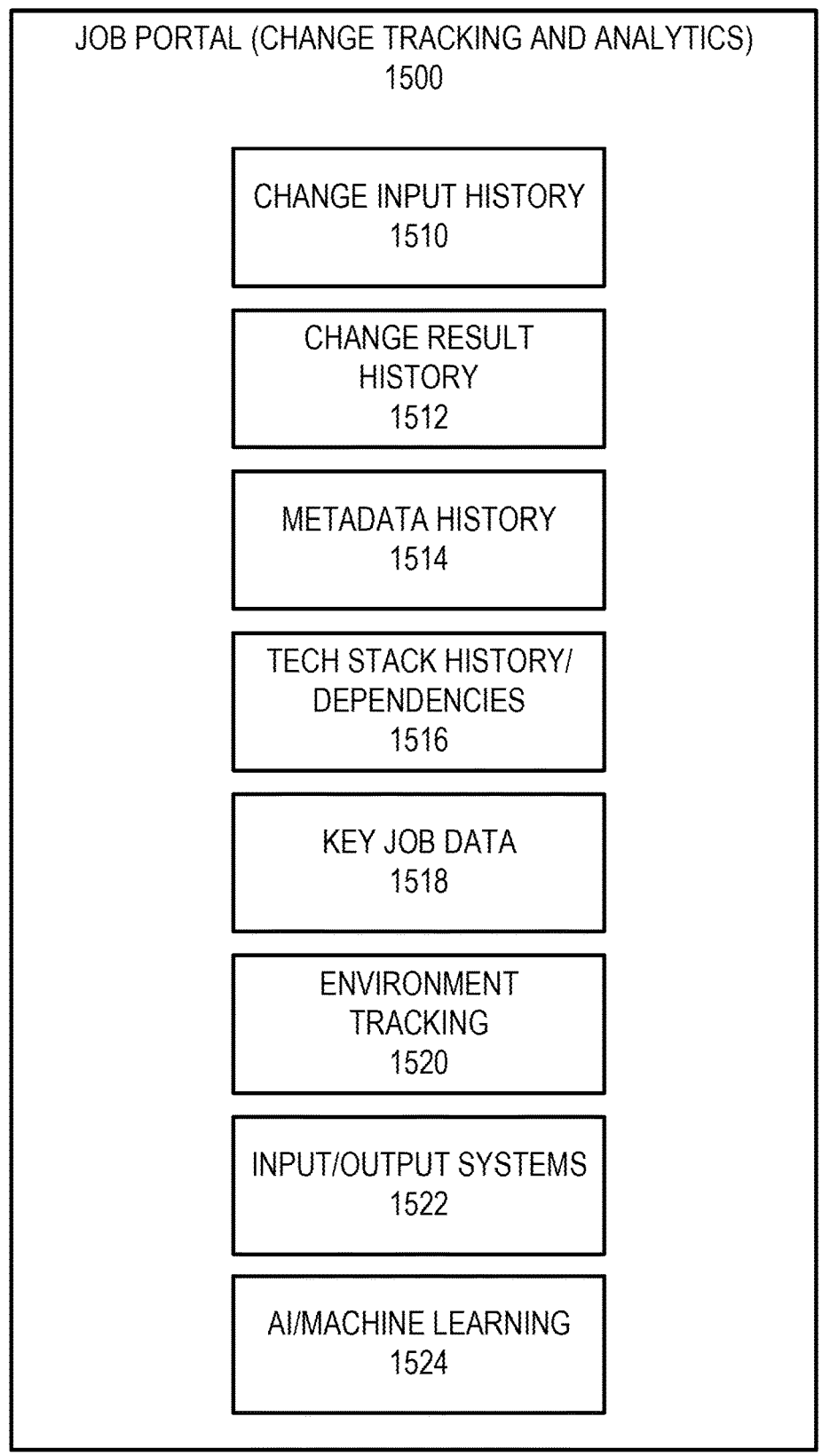
FIG. 15 illustrates aspects of a portal for change tracking and analytics in accordance with aspects described herein.

FIG. 15 illustrates aspects of a portal 1500 for change tracking and analytics in accordance with aspects described herein. Job portal 1500 includes a variety of elements to implement the above systems for change tracking and analytics as described herein. While a number of subsystems are described as part of job portal 1500, it will be apparent that the functions described can be implemented by such systems in various different combinations that can be combined or separated differently that as described in associated with portal 1500 of FIG. 15. Additionally, some implementations may include additional or different combinations of subsystems.

The portal 1500 includes a change input history module 1510, a change result history module 1512, a metadata history module 1514, a tech stack information module 1516, a key job data module 1518, an environment tracking module 1520, an input/output (I/O) system module 1522, and an AI/machine learning module 1524. The modules and history data or other data associated with such modules can be tracked in various ways within portal 1500. Portal 1500 can, for example, track information for any number of applications or application environments, where each application or environment is associated with jobs, application environments in a tech stack, or other such application elements.

The change input history module 1510 tracks records associated with change inputs received by a job portal 1500. The change input information can include initial change inputs, as well as modifications to the initial change that can occur over time either as project details change, or as feedback from downstream. The change history result module 1512 can include both intermediate results, such as communications, updates, downstream impacts, or other such information related to the change input from the change input history module 1510. The information within each module can be associated by application environment as described above, and can additionally be associated by a relationship with a corresponding change input or initial change action that creates impacts in an application environment.

The metadata history module 1514 or the key job data module 1518 can include information or relationship data for information in change input history module 1510 and change history result module 1512 tracking and associating related changes over time. For example, as multiple changes or jobs for an application element occur over time, the metadata history module 1514 can track the changes and modifications to an application that occur over the course of time as associated with various changes. In relationship to an individual change and results of the individual change, when downstream impacts on application elements are identified, but may result in ineffective corrections, the metadata history module 1514 or key data module 1518 may be used to rescind or modify certain changes in whole or in part as an option in error tracking or correcting complex issues that may propagate through one or more tiers of downstream impacts caused by a change. Additionally, the metadata history module 1514 can include any technical or supporting information for a job, a portion of an application, or any division of an application. The information in metadata history module 1514 or key data module 1518 can include technical information that can be matched with a change as new change information is received, as described above. These modules can additionally include contact information for individuals responsible for jobs or application elements in an organization, for use in communications about projects or downstream impacts.

The tech stack information module 1516 and environment tracking module 1520 are corresponding modules for supporting technology stacks used in an application environment. While the metadata history module includes information about jobs and portions of application, the tech stack information module 1516 and environment tracking module 1520 includes similar information about the different environments in a tech stack for an environment. The relevant information can include history data of the function and use of the environment as associated with the application environment using the environment in the tech stack for the application environment. In some implementations, a history of how updates, changes, versions, or other revisions to an environment have impacted an application. This history can either include data or references to information in other modules tied with communications or information about how prior changes were addressed during development or change management, information about expected impacts of future changes and how those expected changes are expected to impact other application elements, or any other such information associated with an item from a tech stack for an application. Contact information for individuals responsible for managing environment usage within an organization can also be included in such modules (e.g., and updated via such modules) for communication of change impacts and managing changes as described herein.

The input/output (I/O) system module 1522 can be used for managing, tracking, and storing data associated for communications as part of any change management operation described herein. As indicated above, this can be initial communications to downstream element owners that occur automatically when an initial change is received, propagation of additional communications or responses as actions and job implementations occur over time, or as errors occur and are addressed as part of a change management process.

The AI/machine learning module 1524 can use data from the various other modules as training data for identifying patterns to improve operations or communications in change management operations. For example, patterns of initial communications in response to a change input of a certain type, however, can be identified for automatic replications in future change management operations.

Figure 16:
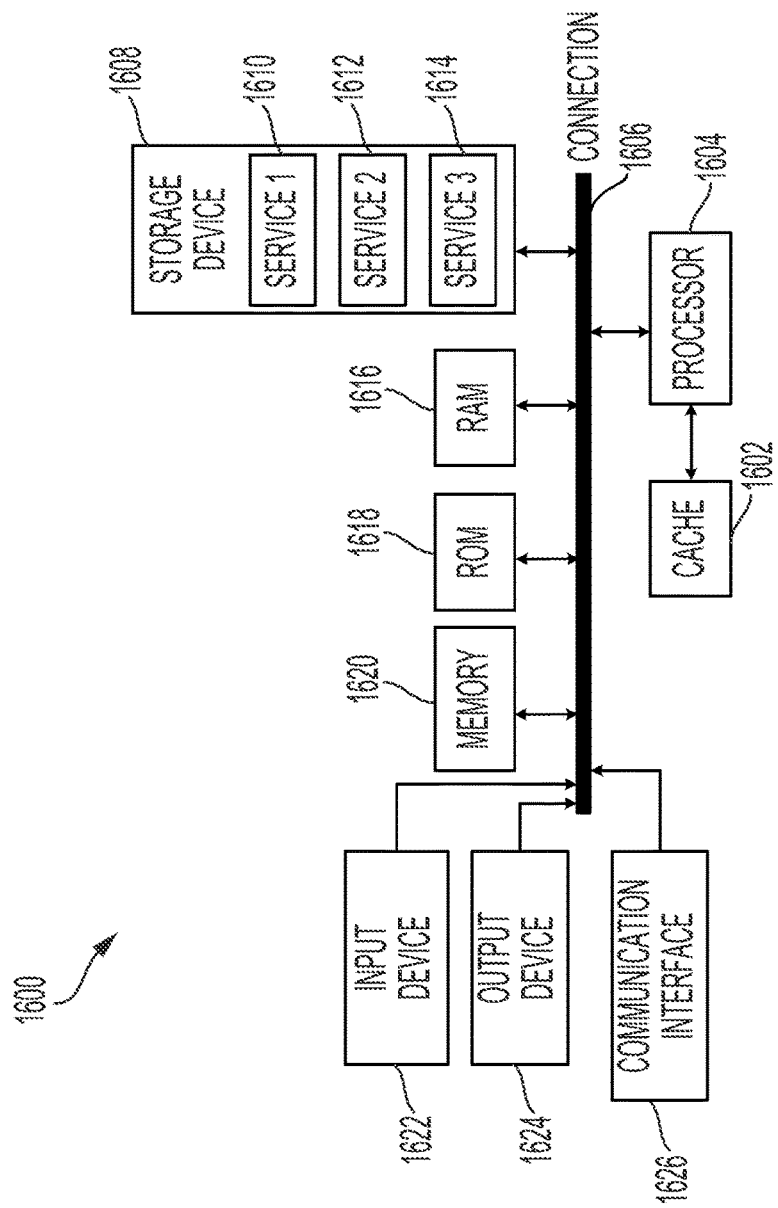
FIG. 16 shows a computing system architecture including various components in electrical communication with each other using a connection in accordance with various examples.

FIG. 16 shows a computing system architecture including various components in electrical communication with each other using a connection in accordance with various examples. FIG. 16 illustrates a computing system architecture 1600 including various components in electrical communication with each other using a connection 1606, such as a bus, in accordance with some implementations. Elements of the computing system architecture 1600, including alternate implementations other than the computing system architecture 1600 can be used to implement a special purpose computing device for data validation systems, data comparison systems, or any system in accordance with aspects described herein.

Example system architecture 1600 includes a processing unit (CPU or processor) 1604 and a system connection 1606 that couples various system components including the system memory 1620, such as ROM 1618 and RAM 1616, to the processor 1604. The system architecture 1600 can include a cache 1602 of high-speed memory connected directly with, in close proximity to, or integrated as part of the processor 1604. The system architecture 1600 can copy data from the memory 1620 and/or the storage device 1608 to the cache 1602 for quick access by the processor 1604. In this way, the cache can provide a performance boost that avoids processor 1604 delays while waiting for data. These and other modules can control or be configured to control the processor 1604 to perform various actions.

Other system memory 1620 may be available for use as well. The memory 1620 can include multiple different types of memory with different performance characteristics. The processor 1604 can include any general-purpose processor and a hardware or software service, such as service 1 1610, service 2 1612, and service 3 1614 stored in storage device 1608, configured to control the processor 1604 as well as a special-purpose processor where software instructions are incorporated into the actual processor design. The processor 1604 may be a completely self-contained computing system, containing multiple cores or processors, a bus, memory controller, cache, etc. A multi-core processor may be symmetric or asymmetric.

To enable user interaction with the computing system architecture 1600, an input device 1622 can represent any number of input mechanisms, such as a microphone for speech, a touch-sensitive screen for gesture or graphical input, keyboard, mouse, motion input, speech and so forth. An output device 1624 can also be one or more of a number of output mechanisms known to those of skill in the art. In some instances, multimodal systems can enable a user to provide multiple types of input to communicate with the computing system architecture 1600. The communications interface 1626 can generally govern and manage the user input and system output. There is no restriction on operating on any particular hardware arrangement and therefore the basic features here may easily be substituted for improved hardware or firmware arrangements as they are developed.

Storage device 1608 is a non-volatile memory and can be a hard disk or other types of computer readable media which can store data that are accessible by a computer, such as magnetic cassettes, flash memory cards, solid state memory devices, digital versatile disks, cartridges, RAMs 1616, ROM 1618, and hybrids thereof.

The storage device 1608 can include services 1610, 1612, 1614 for controlling the processor 1604. Other hardware or software modules are contemplated. The storage device 1608 can be connected to the system connection 1606. In one aspect, a hardware module that performs a particular function can include the software component stored in a computer-readable medium in connection with the necessary hardware components, such as the processor 1604, connection 1606, output device 1624, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein,"

"above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included (e.g. in FIG. 8). A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a keypad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer implemented method comprising:
generating a configuration file, the configuration file including dynamic matching data describing a first plurality of data entries and a second plurality of data entries;
generating a data action file, the data action file identifying a first data set including the first plurality of data entries, a second data set including the second plurality of data entries, a key type, and a value structure associated with the key type, wherein the first data set and the second data set are stored in a data source system, wherein the first plurality of data entries includes first data fields, and wherein the second plurality of data entries includes second data fields;
dynamically generating a plurality of data queries including key type queries, value structure queries and dynamic value structure queries, wherein the dynamic value structure queries are generated in real-time based on the dynamic matching data indicated in the configuration file, and wherein the dynamic value structure queries are being generated based on a first data type, a second data type, and data field types present in the first data set and the second data set;
dynamically executing the plurality of data queries in parallel, wherein parallel execution of the plurality of data queries includes a plurality of simultaneous data queries to the data source system including the first data set and the second data set;
matching fields of the first plurality of data entries and the second plurality of data entries using the key type and the value structure associated with the key type;
identifying corresponding fields of the first data fields and the second data fields having a data mismatch; and
automatically generating a mismatch database entry for the corresponding fields having the data mismatch.

2. The computer implemented method of claim 1, where the first data set includes at least one billion data fields, and wherein the second data set includes at least one billion data fields.

3. The computer implemented method of claim 1, wherein the first data set comprises at least a terabyte of data, and wherein the second data set comprises at least a terabyte of data.

4. The computer implemented method of claim 1, wherein the configuration file further identifies the first data type for the first data set and the second data type for the second data set.

5. The computer implemented method of claim 1, further comprising:
    generating the configuration file associated with the first data set, wherein the configuration file further indicates values used for generation of the dynamic value structure queries, and wherein the configuration file is generated using a machine learning algorithm trained from mismatch database entry training data;
    generating a feedback value associated with the mismatch database entry, wherein the feedback value identifies a difference between an expected result and an actual result in the mismatch database entry, wherein the feedback value is associated with settings in the configuration file; and
    updating the mismatch database entry training data and the machine learning algorithm using the feedback value and the mismatch database entry to generate update mismatch database entry training data.

6. The computer implemented method of claim 1, further comprising using a machine learning algorithm to generate a dynamic query selection table using mismatch training data, wherein the dynamic value structure queries are selected from the dynamic query selection table.

7. The computer implemented method of claim 1, further comprising processing the mismatch database entry to generate a mismatch report providing mismatch metrics for values of the corresponding fields of the first data set and the second data set.

8. The computer implemented method of claim 1, further comprising processing the mismatch database entry using a machine learning algorithm to remove mismatch data where the corresponding fields for the first data set and the second data set include matching content with data mismatches.

9. The computer implemented method of claim 1, further comprising identifying different tiers of matching standards for different corresponding fields of the first data set and the second data set; and
    merging the first data set and the second data set;
    wherein merging the corresponding fields of the first data fields and the second data fields having the data mismatch comprises a multi-tier machine learning algorithm for merging entries having identical key values with mismatched fields.

10. The computer implemented method of claim 1, further comprising:
    identifying corresponding chunks of data from the first data set and the second data set;
    wherein dynamically executing the plurality of data queries in parallel includes generating separate data chunks for independent parallel processing using the corresponding chunks of data from the first data set and the second data set, and
    wherein identifying the corresponding fields of the first data fields and the second data fields having the data mismatch is performed separately on the separate data chunks for the corresponding chunks of data from the first data set and the second data set.

11. The computer implemented method of claim 1, further comprising:
    wherein the plurality of data queries are queries for the first data set and the second data set,
    wherein the key type queries are for fields of the first data fields and the second data fields associated with the key type,
    wherein the dynamic value structure queries are for fields of the first data fields and the second data fields not indicated by the data action file.

12. The computer implemented method of claim 1, wherein the configuration file is generated as the first plurality of data entries and the second plurality of data entries are being received.

13. A device comprising:
    memory; and
    one or more processors coupled to the memory and configured to perform operations including:
        generating a configuration file, the configuration file including dynamic matching data describing a first plurality of data entries and a second plurality of data entries;
        generating a data action file, the data action file identifying a first data set including the first plurality of data entries, a second data set including the second plurality of data entries, a key type, and a value structure associated with the key type, wherein the first data set and the second data set are stored in a data source system, wherein the first plurality of data entries includes first data fields, and wherein the second plurality of data entries includes second data fields;
        dynamically generating a plurality of data queries including key type queries, value structure queries and dynamic value structure queries, wherein the dynamic value structure queries are generated in real-time based on the dynamic matching data indicated in the configuration file, and wherein the dynamic value structure queries are being generated based on a first data type, a second data type, and data field types present in the first data set and the second data set;
        dynamically executing the plurality of data queries in parallel, wherein parallel execution of the plurality of data queries includes a plurality of simultaneous data queries to the data source system including the first data set and the second data set;
        matching fields of the first plurality of data entries and the second plurality of data entries using the key type and the value structure associated with the key type;
        identifying corresponding fields of the first data fields and the second data fields having a data mismatch; and
        automatically generating a mismatch database entry for the corresponding fields having the data mismatch.

14. The device of claim 13, where the first data set includes at least one billion data fields, and wherein the second data set includes at least one billion data fields.

15. The device of claim 13, wherein the first data set comprises at least a terabyte of data, and wherein the second data set comprises at least a terabyte of data.

16. The device of claim 13, wherein the configuration file further identifies the first data type for the first data set and the second data type for the second data set.

17. The device of claim 13, wherein the one or more processors are configured for operations further comprising:
    generating the configuration file associated with the first data set, wherein the configuration file further indicates values used for generation of the dynamic value structure queries, and wherein the configuration file is generated using a machine learning algorithm trained from mismatch database entry training data;

generating a feedback value associated with the mismatch database entry, wherein the feedback value identifies a difference between an expected result and an actual result in the mismatch database entry, wherein the feedback value is associated with settings in the configuration file; and updating the mismatch database entry training data and the machine learning algorithm using the feedback value and the mismatch database entry to generate update mismatch database entry training data.

18. The device of claim 13, wherein the one or more processors are configured for operations further comprising:

using a machine learning algorithm to generate a dynamic query selection table using mismatch training data, wherein the dynamic value structure queries are selected from the dynamic query selection table.

19. The device of claim 13, wherein the one or more processors are configured for operations further comprising:

processing the mismatch database entry to generate a mismatch report providing mismatch metrics for values of the corresponding fields of the first data set and the second data set.

20. The device of claim 13, wherein the one or more processors are configured for operations further comprising:

processing the mismatch database entry using a machine learning algorithm to remove mismatch data where the corresponding fields for the first data set and the second data set include matching content with data mismatches.

21. The device of claim 13, wherein the one or more processors are configured for operations further comprising:

identifying different tiers of matching standards for different corresponding fields of the first data set and the second data set; and merging the first data set and the second data set;

wherein merging the corresponding fields of the first data fields and the second data fields having the data mismatch comprises a multi-tier machine learning algorithm for merging entries having identical key values with mismatched fields.

22. The device of claim 13, wherein the one or more processors are configured for operations further comprising:

identifying corresponding chunks of data from the first data set and the second data set;

wherein dynamically executing the plurality of data queries in parallel includes generating separate data chunks for independent parallel processing using the corresponding chunks of data from the first data set and the second data set, and wherein identifying the corresponding fields of the first data fields and the second data fields having the data mismatch is performed separately on the separate data chunks for the corresponding chunks of data from the first data set and the second data set.

23. The device of claim 13, wherein the one or more processors are configured for operations further comprising:

wherein the plurality of data queries are queries for the first data set and the second data set, wherein the key type queries are for fields of the first data fields and the second data fields associated with the key type, wherein the dynamic value structure queries are for fields of the first data fields and the second data fields not indicated by the data action file.

24. The device of claim 13, wherein the configuration file is generated as the first plurality of data entries and the second plurality of data entries are being received.

25. A non-transitory computer readable storage medium comprising instructions that, when executed by one or more processors of a mobile device, cause the mobile device to perform operations including:

generating a configuration file, the configuration file including dynamic matching data describing a first plurality of data entries and a second plurality of data entries;

generating a data action file, the data action file identifying a first data set including the first plurality of data entries, a second data set including the second plurality of data entries, a key type, and a value structure associated with the key type, wherein the first data set and the second data set are stored in a data source system, wherein the first plurality of data entries includes first data fields, and wherein the second plurality of data entries includes second data fields;

dynamically generating a plurality of data queries including key type queries, value structure queries and dynamic value structure queries, wherein the dynamic value structure queries are generated in real-time based on the dynamic matching data indicated in the configuration file, and wherein the dynamic value structure queries are being generated based on a first data type, a second data type, and data field types present in the first data set and the second data set;

dynamically executing the plurality of data queries in parallel, wherein parallel execution of the plurality of data queries includes a plurality of simultaneous data queries to the data source system including the first data set and the second data set;

matching fields of the first plurality of data entries and the second plurality of data entries using the key type and the value structure associated with the key type;

identifying corresponding fields of the first data fields and the second data fields having a data mismatch; and automatically generating a mismatch database entry for the corresponding fields having the data mismatch.

26. The non-transitory computer readable storage medium of claim 25, where the first data set includes at least one billion data fields, and wherein the second data set includes at least one billion data fields.

27. The non-transitory computer readable storage medium of claim 25, wherein the first data set comprises at least a terabyte of data, and wherein the second data set comprises at least a terabyte of data.

28. The non-transitory computer readable storage medium of claim 25, wherein the configuration file further identifies the first data type for the first data set and the second data type for the second data set.

29. The non-transitory computer readable storage medium of claim 25, wherein the one or more processors are configured for operations further comprising:

generating the configuration file associated with the first data set, wherein the configuration file further indicates values used for generation of the dynamic value structure queries, and wherein the configuration file is generated using a machine learning algorithm trained from mismatch database entry training data;

generating a feedback value associated with the mismatch database entry, wherein the feedback value identifies a difference between an expected result and an actual result in the mismatch database entry, wherein the feedback value is associated with settings in the configuration file; and updating the mismatch database entry training data and the machine learning algorithm using the feedback value and the mismatch database entry to generate update mismatch database entry training data.

30. The non-transitory computer readable storage medium of claim 25, wherein the one or more processors are configured for operations further comprising:

using a machine learning algorithm to generate a dynamic query selection table using mismatch training data, wherein the dynamic value structure queries are selected from the dynamic query selection table.

31. The non-transitory computer readable storage medium of claim 25, wherein the one or more processors are configured for operations further comprising:

processing the mismatch database entry to generate a mismatch report providing mismatch metrics for values of the corresponding fields of the first data set and the second data set.

32. The non-transitory computer readable storage medium of claim 25, wherein the one or more processors are configured for operations further comprising:

processing the mismatch database entry using a machine learning algorithm to remove mismatch data where the corresponding fields for the first data set and the second data set include matching content with data mismatches.

33. The non-transitory computer readable storage medium of claim 25, wherein the one or more processors are configured for operations further comprising:

identifying different tiers of matching standards for different corresponding fields of the first data set and the second data set; and merging the first data set and the second data set;

wherein merging the corresponding fields of the first data fields and the second data fields having the data mismatch comprises a multi-tier machine learning algorithm for merging entries having identical key values with mismatched fields.

34. The non-transitory computer readable storage medium of claim 25, wherein the one or more processors are configured for operations further comprising:

identifying corresponding chunks of data from the first data set and the second data set;

wherein dynamically executing the plurality of data queries in parallel includes generating separate data chunks for independent parallel processing using the corresponding chunks of data from the first data set and the second data set, and wherein identifying the corresponding fields of the first data fields and the second data fields having the data mismatch is performed separately on the separate data chunks for the corresponding chunks of data from the first data set and the second data set.

35. The non-transitory computer readable storage medium of claim 25, wherein the one or more processors are configured for operations further comprising:

wherein the plurality of data queries are queries for the first data set and the second data set, wherein the key type queries are for fields of the first data fields and the second data fields associated with the key type, wherein the dynamic value structure queries are for fields of the first data fields and the second data fields not indicated by the data action file.

36. The non-transitory computer readable storage medium of claim 25, wherein the configuration file is generated as the first plurality of data entries and the second plurality of data entries are being received.

* * * * *